(12) United States Patent
Aromin

(10) Patent No.: US 7,525,777 B2
(45) Date of Patent: Apr. 28, 2009

(54) FIREGUARD CIRCUIT

(75) Inventor: Victor V. Aromin, West Warwick, RI (US)

(73) Assignee: Tower Manufacturing Corporation, Providence, RI (US)

( * ) Notice: Subject to any disclaimer, the term of this patent is extended or adjusted under 35 U.S.C. 154(b) by 202 days.

(21) Appl. No.: 10/886,269

(22) Filed: Jul. 7, 2004

(65) Prior Publication Data

US 2005/0030677 A1  Feb. 10, 2005

Related U.S. Application Data

(63) Continuation-in-part of application No. 10/102,539, filed on Mar. 27, 2002, now Pat. No. 6,738,241, and a continuation-in-part of application No. 10/783,966, filed on Feb. 20, 2004, now abandoned, and a continuation-in-part of application No. 10/846,358, filed on May 13, 2004, now abandoned.

(51) Int. Cl.
*H02H 3/00* (2006.01)
*H02H 9/08* (2006.01)

(52) U.S. Cl. .............................. 361/42; 361/43; 361/45; 361/46

(58) Field of Classification Search .................. 361/42, 361/43, 45–46
See application file for complete search history.

(56) References Cited

U.S. PATENT DOCUMENTS

| | | | |
|---|---|---|---|
| 4,015,169 A | | 3/1977 | Misencik |
| 4,194,231 A | | 3/1980 | Klein |
| 4,209,817 A | * | 6/1980 | McGinnis ..................... 361/94 |
| 4,219,857 A | | 8/1980 | Haraldsson et al. |
| 4,370,692 A | | 1/1983 | Wellman, Jr. et al. |
| 4,378,579 A | | 3/1983 | Hudson, Jr. |
| 4,523,269 A | * | 6/1985 | Baker et al. .................. 363/138 |
| 4,598,331 A | | 7/1986 | Legatti |
| 4,709,293 A | | 11/1987 | Gershen et al. |
| 4,849,734 A | * | 7/1989 | Williamson ................. 340/506 |
| 4,858,054 A | | 8/1989 | Franklin |
| 4,860,147 A | * | 8/1989 | Fai .............................. 361/50 |
| 4,931,894 A | * | 6/1990 | Legatti ........................ 361/45 |
| 4,933,801 A | * | 6/1990 | Glennon et al. ............... 361/45 |
| 5,166,853 A | | 11/1992 | Gershen et al. |
| 5,177,657 A | | 1/1993 | Baer et al. |
| 5,185,686 A | | 2/1993 | Hansen et al. |
| 5,274,262 A | * | 12/1993 | Avery ........................ 257/362 |

(Continued)

*Primary Examiner*—Michael J Sherry
*Assistant Examiner*—Dharti H Patel
(74) *Attorney, Agent, or Firm*—Kriegsman & Kriegsman

(57) ABSTRACT

A fireguard circuit for a power cable, which comprises a power line, a neutral line and a metal sheath surrounding the power line and the neutral line, includes a switch located in one of the lines. A solenoid sets the switch in either an open position or a closed position. A first silicon controlled rectifier (SCR) causes the solenoid to open the switch upon detecting the presence of an arcing condition between the power line and the metal sheath. A second silicon controlled rectifier (SCR) causes the solenoid to open the switch upon detecting the presence of an arcing condition between the neutral line and the metal sheath. The second SCR is connected in parallel with the first SCR, the anode of the first SCR being connected to the cathode of the second SCR and the cathode of the first SCR being connected to the anode of the second SCR.

9 Claims, 19 Drawing Sheets

U.S. PATENT DOCUMENTS

| | | |
|---|---|---|
| 5,402,298 A * | 3/1995 | Gershen et al. ............... 361/50 |
| 5,420,740 A | 5/1995 | MacKenzie et al. |
| 5,528,445 A * | 6/1996 | Cooke et al. .................. 361/20 |
| 5,661,623 A * | 8/1997 | McDonald et al. ............ 361/42 |
| 5,691,869 A | 11/1997 | Engel et al. |
| 5,757,598 A | 5/1998 | Aromin |
| 5,889,643 A | 3/1999 | Elms |
| 5,963,405 A | 10/1999 | Engel et al. |
| 5,963,406 A * | 10/1999 | Neiger et al. ................. 361/42 |
| 6,014,297 A | 1/2000 | Clarey et al. |
| 6,084,207 A | 7/2000 | Jones |
| 6,107,611 A | 8/2000 | Jones |
| 6,198,611 B1 | 3/2001 | Macbeth |
| 6,229,679 B1 | 5/2001 | Macbeth |
| 6,266,219 B1 | 7/2001 | Macbeth et al. |
| 6,292,337 B1 * | 9/2001 | Legatti et al. ................. 361/46 |
| 6,525,914 B1 | 2/2003 | Legatti |
| 6,738,241 B1 * | 5/2004 | Aromin ....................... 361/42 |
| 7,236,342 B2 * | 6/2007 | Vazach et al. ............... 361/119 |

* cited by examiner

FIREGUARD CIRCUIT

CROSS-REFERENCE TO RELATED APPLICATIONS

The present application is a continuation-in-part of application Ser. No. 10/102,539 filed Mar. 27, 2002, now U.S. Pat. No. 6,738,241 which issued in the name of Victor V. Aromin on May 18, 2004, and U.S. patent application Ser. No. 10/783,966 which was filed on Feb. 20, 2004 now abandoned in the name of Victor V. Aromin, and U.S. patent application Ser. No. 10/846,358 which was filed on May 13, 2004 now abandoned in the name of Victor V. Aromin, the disclosures of all being incorporated herein by reference.

BACKGROUND OF THE INVENTION

The present invention relates generally to electrical safety devices and more particularly to electrical safety devices for a power cable.

Conventional electrical appliances typically receive alternating current (AC) power from a power source, such as an electrical outlet, through a power cable. The power cable enables the electrical appliance, or load, to receive from the power source the current necessary to operate.

A power cable typically comprises at least two conducting lines through which current travels from the power source to the load. Specifically, a power cable typically comprises a power line and a neutral line. A metal sheath can be used to surround the power line and the neutral line in order to provide the power cable with arc sensing capabilities.

The connection of an electrical appliance to a power supply through a pair of conducting lines can create a number of potentially dangerous conditions. In particular, there exists the risk of ground fault and grounded neutral conditions in the conducting lines. A ground fault condition occurs when there is an imbalance between the currents flowing in the power and neutral lines. A grounded neutral condition occurs when the neutral line is grounded at the load.

Ground fault circuit interrupters are well known in the art and are commonly used to protect against ground fault and grounded neutral conditions. A ground fault circuit interrupter (GFCI) typically comprises a differential transformer with opposed primary windings, one primary winding being associated with the power line and the other primary winding being associated with the neutral line. If a ground fault condition should occur on the load side of the GFCI, the two primary windings will no longer cancel, thereby producing a flux flow in the core of the differential transformer. This resultant flux flow is detected by a secondary winding wrapped around the differential transformer core. In response thereto, the secondary winding produces a trip signal which, in turn, serves to open at least one of the conducting lines between the power supply and the load, thereby eliminating the dangerous condition.

As an example, in U.S. Pat. No. 5,757,598, to V. V. Aromin, there is disclosed a ground fault circuit interrupter (GFCI) which interrupts the flow of current through a pair of lines extending between a source of power and a load. The GFCI includes a circuit breaker having a switch located in one of the pair of the lines. The switch has a first position in which the source of power in its associated line is not connected to the load and a second position in which the source of power in its associated line is connected to the load. A relay circuit is coupled to the switch for selectively positioning the switch in either the first or second position. The relay circuit includes a solenoid which operates in either an energized or a de-energized state. When energized, the solenoid positions the switch in its second position and when de-energized, the solenoid positions the switch in its first position. The GFCI also includes a booster circuit for selectively supplying a first voltage through the switch and to the solenoid which is sufficient to cause the solenoid to switch from its de-energized state to its energized state. A power supply circuit supplies a second voltage to the solenoid which is less than the first voltage. The second voltage is sufficient to maintain the solenoid in its energized state after being initially energized by the first voltage but is insufficient to switch the solenoid from its de-energized state to its energized state. A latch circuit operable in first and second bi-stable states allows the solenoid to switch from its de-energized state to its energized state and remain in its energized state when in its first bi-stable state and allowing solenoid to switch from its energized state to its de-energized state and remain in its de-energized state when in its second bi-stable state. A fault detection circuit detects the presence of a fault condition in at least one of the lines extending between the power and the load and causes the latch circuit to latch in its second bi-stable state upon detection of the fault condition.

While GFCI circuits of the type described above are well known and widely used in commerce to protect against ground fault and grounded neutral conditions, it should be noted that a power cable is susceptible to other types of hazardous conditions which are not protected against by a conventional GFCI circuit.

As an example, it has been found that one type of arcing condition can occur between one of the conducting lines and the metal sheath which surrounds the conducting lines. It should be noted that the presence of this type of arcing condition between either the power line and the metal sheath or the neutral line and the metal sheath can result in a fire or other dangerous condition, which is highly undesirable.

Accordingly, in U.S. Pat. No. 4,931,894 to R. Legatti, there is disclosed a ground fault current interrupter circuit (GFCI) which is provided with the additional capacity of detecting and protecting against arcing between a power line and the metal sheath or cover of a power cable. An arc protection winding is located on the core of the GFCI differential transformer and is connected in series with a resistance between the metal sheath and a neutral or return line. By adjusting the number of turns of the arc protection winding and the size of the series resistance, the sensitivity of the arc protection arrangement to arcing current may be set at a desired level.

Although well known in commerce, the GFCI disclosed in Legatti suffers from a notable drawback. Specifically, the GFCI disclosed in Legatti requires a differential transformer in order to detect arcing conditions between the power line and the metal sheath or the neutral line and the metal sheath. As can be appreciated, the implementation of a differential transformer significantly increases the overall size and cost of the product, which is highly undesirable.

SUMMARY OF THE INVENTION

It is an object of the present invention to provide a new and improved safety circuit for a power cable which includes two or more conducting lines and a metal sheath surrounding the conducting lines.

It is another object of the present invention to provide a safety circuit as described above which senses the presence of an arcing condition between one of the conducting lines and the metal sheath, and in response thereto, opens at least one of the conducting lines between the power supply and the load.

It is yet another object of the present invention to provide a safety circuit as described above which may be mass produced, has a minimal number of parts, and can be easily assembled.

Accordingly, in one embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and a nuisance tripping resistor connected to said first SCR to reduce the likelihood of nuisance tripping in said first SCR.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and an indicator circuit connected to said power and neutral lines at said load, said indicator circuit providing an indication as to whether power is being applied to said load.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, a second silicon controlled rectifier (SCR) for detecting the presence of an arcing condition between the other of said lines and the metal sheath, said second SCR setting said circuit opening device at its second state upon detecting the presence of an arcing condition between the other of said lines and the metal sheath, said second SCR comprising an anode, a cathode and a gate, and a zener diode connected to said second SCR to reduce the peak voltage at which the metal sheath biases.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, a second silicon controlled rectifier (SCR) for detecting the presence of an arcing condition between the other of said lines and the metal sheath, said second SCR setting said circuit opening device at its second state upon detecting the presence of an arcing condition between the other of said lines and the metal sheath, said second SCR comprising an anode, a cathode and a gate, and a transistor circuit connected to said second SCR to reduce the peak voltage at which the metal sheath biases.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and a diode bridge for detecting the presence of an arcing condition between the other of said lines and the metal sheath, said diode bridge setting said circuit opening device at its second state upon detecting the presence of an arcing condition between the other of said lines and the metal sheath.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and a zener diode connected to the metal sheath to reduce voltage bias in the metal sheath.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and a first bias resistor for reducing voltage bias in the metal sheath, said first bias resistor comprising a first terminal connected to one of said lines and a second terminal connected to the metal sheath.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch located in one of said lines between the power source and the load, said switch having a first position in which the power source in its associated line is connected to the load and a second position in which the power source in its associated line is not connected to the load, a circuit opening device for setting said switch in either its first position or its second position, said circuit opening device being operable in either a first state or a second state, said circuit opening device setting said switch in its first position when in its first state and said circuit opening device setting said switch in its second position when in its second state, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and a test circuit connected to one of said lines to ensure proper operation of said fireguard circuit.

In another embodiment of the present invention, there is provided a fireguard circuit for use with a power cable, said power cable connecting a power source with a load, said power cable comprising a power line, a neutral line and a metal sheath which surrounds the power line and the neutral line, said fireguard circuit comprising a circuit breaker comprising a first switch and a second switch, the first switch being located in the power line between the power source and the load, the second switch being located in the neutral line between the power source and the load, each of said first and second switches having a first position in which the power source in its associated line is connected to the load and a second position in which the power source in its associated line is not connected to the load, a circuit opening device for setting each of said first and second switches in either its first position or its second position, said circuit opening device being operable in either a first state or a second state, said circuit opening device setting each of said switches in its first position when in its first state and said circuit opening device setting each of said switches in its second position when in its second state, the power connection for said circuit opening device being derived from the power line at the power source, a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, the power connection for said first SCR being derived from the neutral lines at the power source, and a third switch located in the line between said circuit opening device and the power line at the power source, the third switch having a first position in which the power source is connected to said circuit opening device and a second position in which the power source is not connected to said circuit opening device, said circuit opening device setting said third switch in its first position when in its first state and said circuit opening device setting said third switch in its second position when in its second state.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
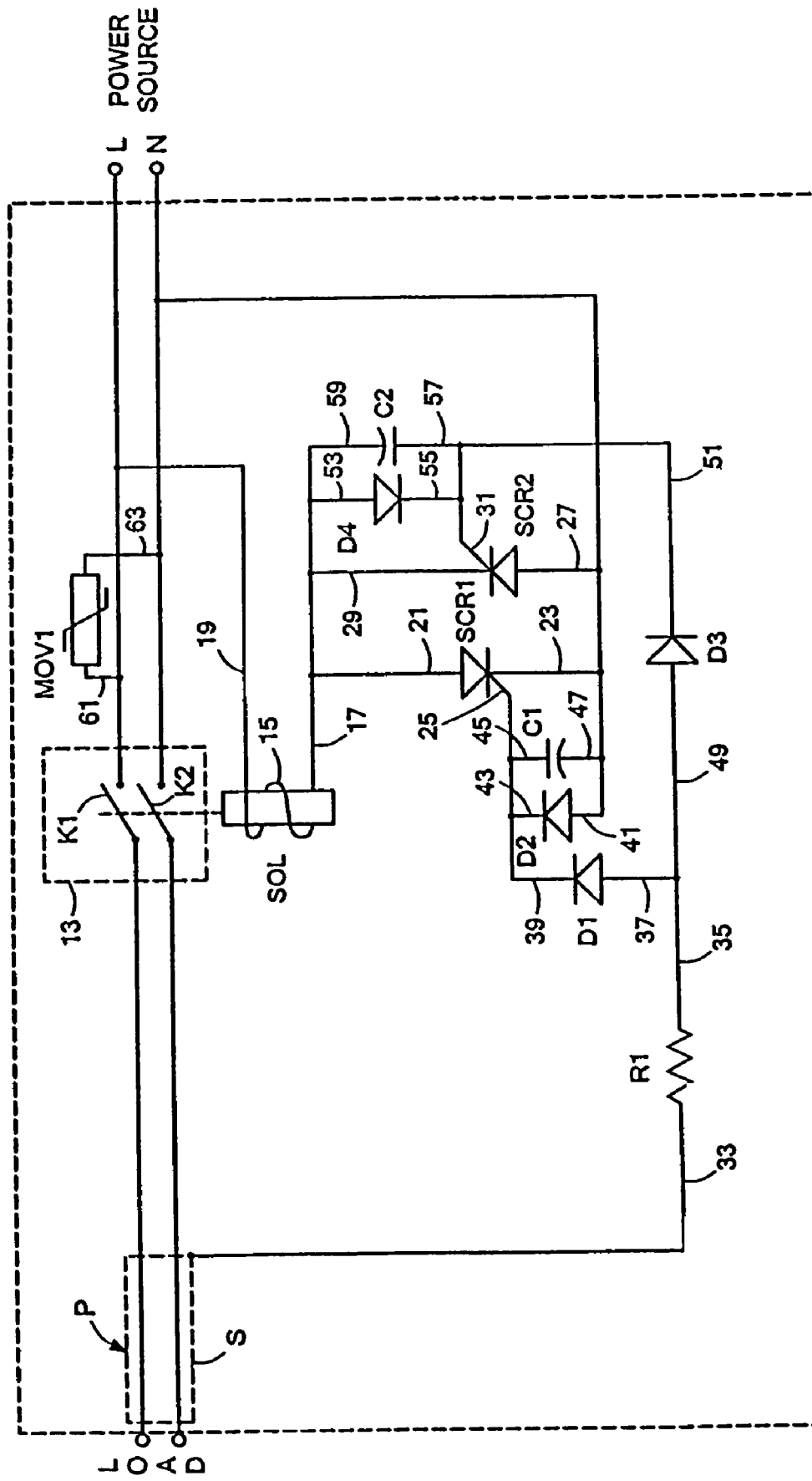
FIG. 1 is a schematic circuit diagram of a first embodiment of a fireguard circuit constructed according to the teachings of the present invention.

Referring now to FIG. 1, there is shown a first embodiment of a fireguard circuit constructed according to the teachings of the present invention, the fireguard circuit being represented generally by reference numeral 11. Fireguard circuit 11 is designed principally for use as a safety device for a power cable P which connects a power source (i.e., a line) to a load, said power cable P including a power line L and a neutral line N. Each of the power and neutral lines L and N is wrapped with a metal sheath or other similar type of shielded wrapping. The metal sheaths of the power and neutral lines L and N are, in turn, twisted together so as to effectively form a single metal sheath S which surrounds power line L and neutral line N.

As will be discussed in detail below, fireguard circuit 11 interrupts the flow of current through power line L and neutral line N extending between the power source and the load when an arcing condition occurs either between power line L and metal sheath S or between neutral line N and metal sheath S. As can be appreciated, the presence of an arcing condition either between power line L and metal sheath S or between neutral line N and metal sheath S can result in a fire or other dangerous condition, which is highly undesirable.

Fireguard circuit 11 (which is also referred to herein as safety circuit 11) comprises a circuit breaker 13 which selectively opens and closes power line L and neutral line N. Circuit breaker 13 includes a first normally-closed switch K1 which is located in power line L between the power source and the load. Circuit breaker 13 also includes a second normally-closed switch K2 which is located in neutral line N between the power source and the load.

Switches K1 and K2 can be positioned in either of two connective positions. Specifically, switches K1 and K2 can be positioned in either a first, or closed, position or a second, or open, position. With switches K1 and K2 disposed in their closed position, which is the opposite position as illustrated in FIG. 1, current is able to flow from the power source to the load. With switches K1 and K2 disposed in their open position, which is illustrated in FIG. 1, current is unable to flow from the power source to the load.

A solenoid SOL is ganged to the circuit breaker contacts of switches K1 and K2 and is responsible for selectively controlling the connective position of switches K1 and K2. Specifically, when solenoid SOL is de-energized, switches K1 and K2 remain in their closed positions. However, when solenoid SOL is energized, solenoid SOL moves and maintains switches K1 and K2 into their open positions. Solenoid SOL includes a winding 15 which includes a first end 17 and a second end 19, second end 19 being connected to power line L.

It should be noted that fireguard circuit 11 is not limited to the use of solenoid SOL to selectively move and maintain the connective position of switches K1 and K2. Rather, it is to be understood that solenoid SOL could be replaced with alternative types of circuit opening devices which are well known in the art without departing from the spirit of the present invention.

A first silicon controlled rectifier SCR1 acts to detect the presence of an arcing condition between the power line L and the metal sheath S and to switch solenoid SOL from its de-energized state to its energized state upon detecting the presence of the arcing condition between the power line L and the metal sheath S. First silicon controlled rectifier SCR1 preferably has a model number of EC103B and includes an anode 21, a cathode 23 and a gate 25. Anode 21 of first silicon controlled rectifier SCR1 is connected to first end 17 of winding 15.

A second silicon controlled rectifier SCR2 acts to detect the presence of an arcing condition between the neutral line N and the metal sheath S and to switch solenoid SOL from its de-energized state to its energized state upon detecting the presence of the arcing condition between the neutral line N and the metal sheath S. Second silicon controlled rectifier SCR2 preferably has a model number of EC103B and includes an anode 27, a cathode 29 and a gate 31. Anode 27 of second silicon controlled rectifier SCR2 is connected to cathode 23 of first silicon controlled rectifier SCR1. Cathode 29 of second silicon controlled rectifier SCR2 is connected to anode 21 of first silicon controlled rectifier SCR1.

It should be noted that the inclusion and particular connection of rectifiers SCR1 and SCR2 is critical to the proper functioning of the present invention. Specifically, first rectifier SCR1 is disposed in parallel with second rectifier SCR2, with first rectifier SCR1 being disposed in the opposite direction from second rectifier SCR2. Due to the opposite polarities of rectifiers SCR1 and SCR2, only first SCR1 will energize solenoid SOL upon the presence of an arcing condition between hot line L and metal sheath S. Similarly, due to the opposite polarities of rectifiers SCR1 and SCR2, only second rectifier SCR2 will energize solenoid SOL upon the presence of an arcing condition between neutral line N and metal sheath S. As such, with alternating current (AC) power traveling through power cable P, first rectifier SCR1 serves to monitor the positive half of the current cycle and second rectifier SCR2 serves to monitor the negative half of the current cycle, as will be described further below.

A voltage dropping resistor R1 has a value of approximately 1.0 Kohm and includes a first terminal 33 and a second terminal 35. First terminal 33 of resistor R1 is connected to metal sheath S. Accordingly, the presence of an arcing condition between either power line L and metal sheath S or neutral line N and metal sheath S creates a current leakage which travels through resistor R1. As such, resistor R1 serves to drop the current leakage voltage to an acceptable level before said current leakage voltage is passed onto first and second rectifiers SCR1 and SCR2.

A first isolation diode D1 serves to isolate the gate connection of first rectifier SCR1 for reverse transients. First isolation diode D1 preferably has a model number of IN4004 and includes an anode 37 and a cathode 39. Anode 37 of first isolation diode D1 is connected to second terminal 35 of resistor R1. Cathode 39 of first isolation diode D1 is connected to gate 25 of first rectifier SCR1.

A first protection diode D2 serves to protect the gate connection of first rectifier SCR1 from an overvoltage, or shunt, condition. First protection diode D2 preferably has a model number of IN4004 and includes an anode 41 and a cathode 43. Anode 41 of first protection diode D2 is connected to cathode 23 of first rectifier SCR1. Cathode 43 of first protection diode D2 is connected to gate 25 of first rectifier SCR1.

A first capacitor C1 serves to filter out high frequency noise from passing onto the gate connection of first rectifier SCR1. First capacitor C1 preferably has a value of approximately 0.1 uF and includes a first terminal 45 and a second terminal 47. First terminal 45 of first capacitor C1 is connected to gate 25 of first rectifier SCR1. Second terminal 47 of first capacitor C1 is connected to cathode 23 of first rectifier SCR1.

A second isolation diode D3 serves to isolate the gate connection of second rectifier SCR2 for reverse transients. Second isolation diode D3 preferably has a model number of IN4004 and includes an anode 49 and a cathode 51. Anode 49 of second isolation diode D3 is connected to second terminal 35 of resistor R1. Cathode 51 of second isolation diode D3 is connected to gate 31 of second rectifier SCR2.

A second protection diode D4 serves to protect the gate connection of second rectifier SCR2 from an overvoltage, or shunt, condition. Second protection diode D4 preferably has a model number of IN4004 and includes an anode 53 and a cathode 55. Anode 53 of second protection diode D4 is connected to first end 17 of winding 15. Cathode 55 of second protection diode D4 is connected to gate 31 of second rectifier SCR2.

A second capacitor C2 serves to filter out high frequency noise from passing onto the gate connection of second rectifier SCR2. Second capacitor C2 preferably has a value of approximately 0.1 uF and includes a first terminal 57 and a second terminal 59. First terminal 57 of second capacitor C2 is connected to gate 31 of second rectifier SCR2. Second terminal 59 of second capacitor C2 is connected to first end 17 of winding 15.

A metal-oxide varistor MOV1 protects against voltage surges in power and neutral conducting lines L and H. Metal-oxide varistor MOV1 preferably has a model number of Z151 and includes a first terminal 61 and a second terminal 63. First terminal 61 of metal-oxide varistor MOV1 is connected to power line L and second terminal 63 of metal-oxide varistor MOV1 is connected to neutral line N.

In use, fireguard switch 11 functions in the following manner. In the absence of arcing conditions, switches K1 and K2 are disposed in their normally-closed positions, thereby enabling AC power to pass from the power source to the load through power and neutral lines L and N.

Upon the presence of an arcing condition between power line L and metal sheath S, leakage voltage travels from metal sheath S and passes through resistor R1, resistor R1 dropping the leakage voltage to an acceptable level. The reduced leakage voltage travels through both isolation diodes D1 and D3. However, due to the opposite polarities of rectifiers SCR1 and SCR2, the reduced leakage voltage only triggers gate 25 of first rectifier SCR1 and does not trigger gate 31 of second rectifier SCR2. Specifically, the reduced leakage voltage only triggers gate 25 of rectifier SCR1 because the signal at gate 25 is opposite in potential with respect to the polarity of cathode 23. The triggering of gate 25 causes first rectifier SCR1 to conduct which, in turn, energizes solenoid SOL. Once energized, solenoid SOL opens switches K1 and K2 which, in turn, serves to eliminate the arcing condition, which is highly desirable.

Upon the presence of an arcing condition between neutral line L and metal sheath S, leakage voltage travels from metal sheath S and passes through resistor R1, resistor R1 dropping the leakage voltage to an acceptable level. The reduced leakage voltage travels through both isolation diodes D1 and D3. However, due to the opposite polarities of rectifiers SCR1 and SCR2, the reduced leakage voltage only triggers gate 31 of second rectifier SCR2 and does not trigger gate 25 of first rectifier SCR1. Specifically, the reduced leakage voltage only triggers gate 31 of rectifier SCR2 because the signal at gate 31 is opposite in potential with respect to the polarity of cathode 29. The triggering of gate 31 causes second rectifier SCR2 to conduct which, in turn, energizes solenoid SOL. Once energized, solenoid SOL opens switches K1 and K2 which, in turn, serves to eliminate the arcing condition, which is highly desirable.

It should be noted that fireguard circuit 11 differs from conventional electrical safety devices in that fireguard 11 comprises a pair of opposite polarity silicon controlled rectifiers which are disposed in parallel for sensing the presence of an arcing condition rather than a differential transformer. The fact that fireguard circuit 11 utilizes a pair of silicon controlled rectifiers rather than a differential transformer renders fireguard circuit 11 more compact in size and less expensive to manufacture than conventional electrical safety devices which utilize a differential transformer, which is highly desirable.

Figure 2:
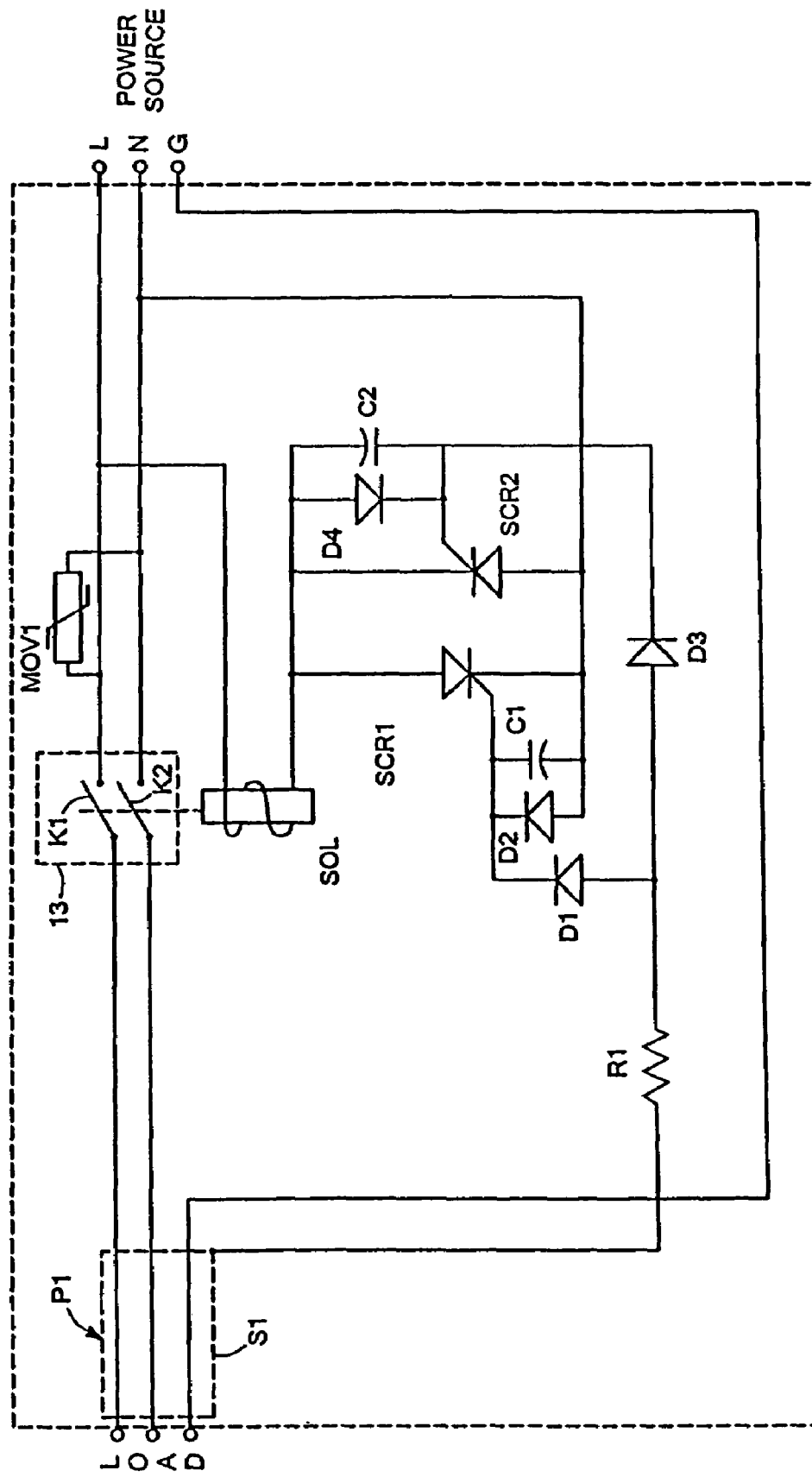
FIG. 2 is a schematic circuit diagram of a second embodiment of a fireguard circuit constructed according to the teachings of the present invention.

It should also be noted that, although fireguard circuit 11 is shown for use as a safety device for a power cable which comprises two conducting lines, it is to be understood that fireguard circuit 11 could also be used as a safety device for a power cable which comprises three conducting lines without departing from the spirit of the present invention. Specifically, referring now FIG. 2, there is shown a second embodiment of a fireguard circuit constructed according to the teachings of the present invention, the fireguard circuit being represented generally by reference numeral 111.

Fireguard circuit 111 (which is also referred to herein as safety circuit 111) is identical in all respects with fireguard circuit 11 except for the fact that fireguard circuit 111 is designed principally for use as a safety device for a power cable P1 which includes three conducting lines whereas fireguard circuit 11 is designed principally for use as a safety device for a power cable P which includes two conducting lines. Specifically, power cable P1 includes a power line L, a neutral line N and a ground line G. Power line L and neutral line N are each wrapped with a metal sheath or other type of similar wrapping. The metal sheaths of power line L and neutral line N are then, in turn, twisted together so as to effectively form a single metal sheath S1 which surrounds power line L and neutral line N. Ground line G remains electrically isolated from power line L and neutral line N.

Figure 3:
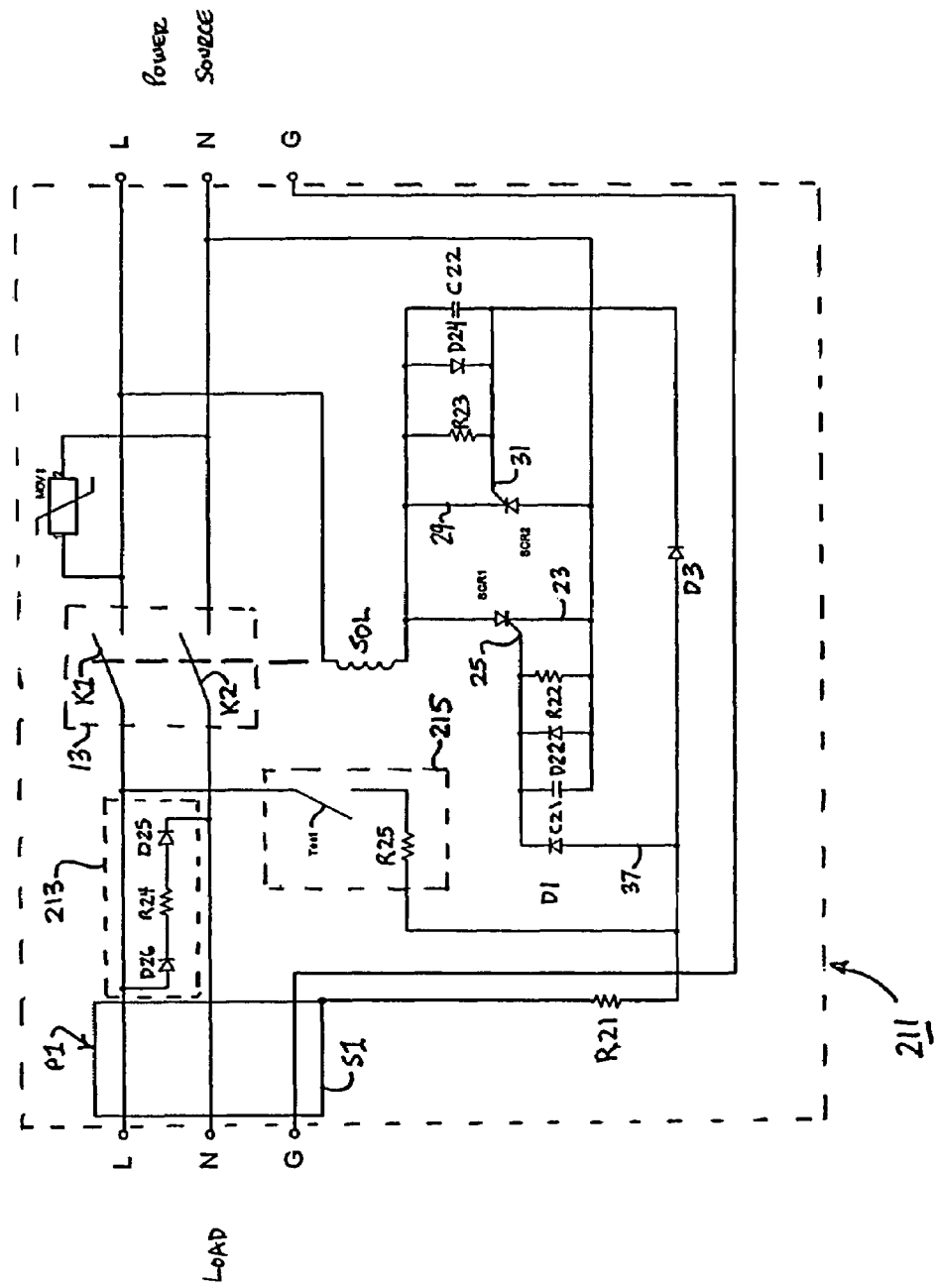
FIG. 3 is a schematic circuit diagram of a third embodiment of a fireguard circuit constructed according to the teachings of the present invention.

Referring now FIG. 3, there is shown a third embodiment of a fireguard circuit constructed according to the teachings of the present invention, the fireguard circuit being represented generally by reference numeral 211.

Fireguard circuit 211 (which may also be referred to herein as safety circuit 211) is identical in all respects with fireguard circuit 111 with four primary distinctions, as will be enumerated below.

First, the preferred value and/or model type of selected components in fireguard circuit 111 are modified slightly in fireguard circuit 211. Specifically, voltage dropping resistor R1 in fireguard circuit 111 is replaced with a voltage dropping resistor R21 in fireguard circuit 211, voltage dropping resistor R21 preferably having a value of approximately 15 Kohms. In addition, protection diodes D2 and D4 in fireguard circuit 111 are replaced with protection diodes D22 and D24, respectively, in fireguard circuit 211, each of protection diodes D22 and D24 preferably having a model number of 1N4148. Furthermore, capacitors C1 and C2 in fireguard circuit 111 are replaced with capacitors C21 and C22, respectively, in fireguard circuit 211, each of capacitors C21 and C22 preferably having a value of approximately 0.22 uF.

Second, a pair of nuisance tripping resistors R22 and R23 are included in fireguard circuit 211, each of resistors R22 and R23 preferably having a value of approximately 330 ohms. Resistor R22 is connected in parallel with capacitor C21 and protection diode D22, with one of its terminals connected to gate 25 of first rectifier SCR1 and the other of its terminals connected to cathode 23 of first rectifier SCR1. Similarly, resistor R23 is connected in parallel with capacitor C22 and protection diode D24, with one of its terminals connected to gate 31 of second rectifier SCR2 and the other of its terminals connected to cathode 29 of second rectifier SCR2. In use, resistors R22 and R23 serve to reduce the likelihood of nuisance tripping in rectifiers SCR1 and SCR2, respectively.

Third, an indicator circuit 213 is included in fireguard circuit 211, indicator circuit 213 connecting power line L to neutral line N at a location between sheath S1 and circuit breaker 13. Indicator circuit 213 comprises a light emitting diode (LED) D25, a current limiting resistor R24 and a protection diode D26 which are connected in series. Preferably, current limiting resistor R24 has a value of approximately 33 Kohms and protection diode D26 has a model number of 1N4004. In use, indicator circuit 213 serves to provide a visual indication (i.e., a light) when power is being applied to the load.

Fourth, a test circuit 215 is included in fireguard circuit 211, test circuit 215 connecting power line L (at a location between sheath S1 and circuit breaker 13) to anode 37 of first isolation diode D1. Test circuit 215 comprises a test switch TEST and a resistor R25 which are connected in series. Preferably, resistor R25 has a value of approximately 33 Kohms. In use, test circuit 215 allows the user to test whether fireguard circuit 211 is operating properly.

Figure 4:
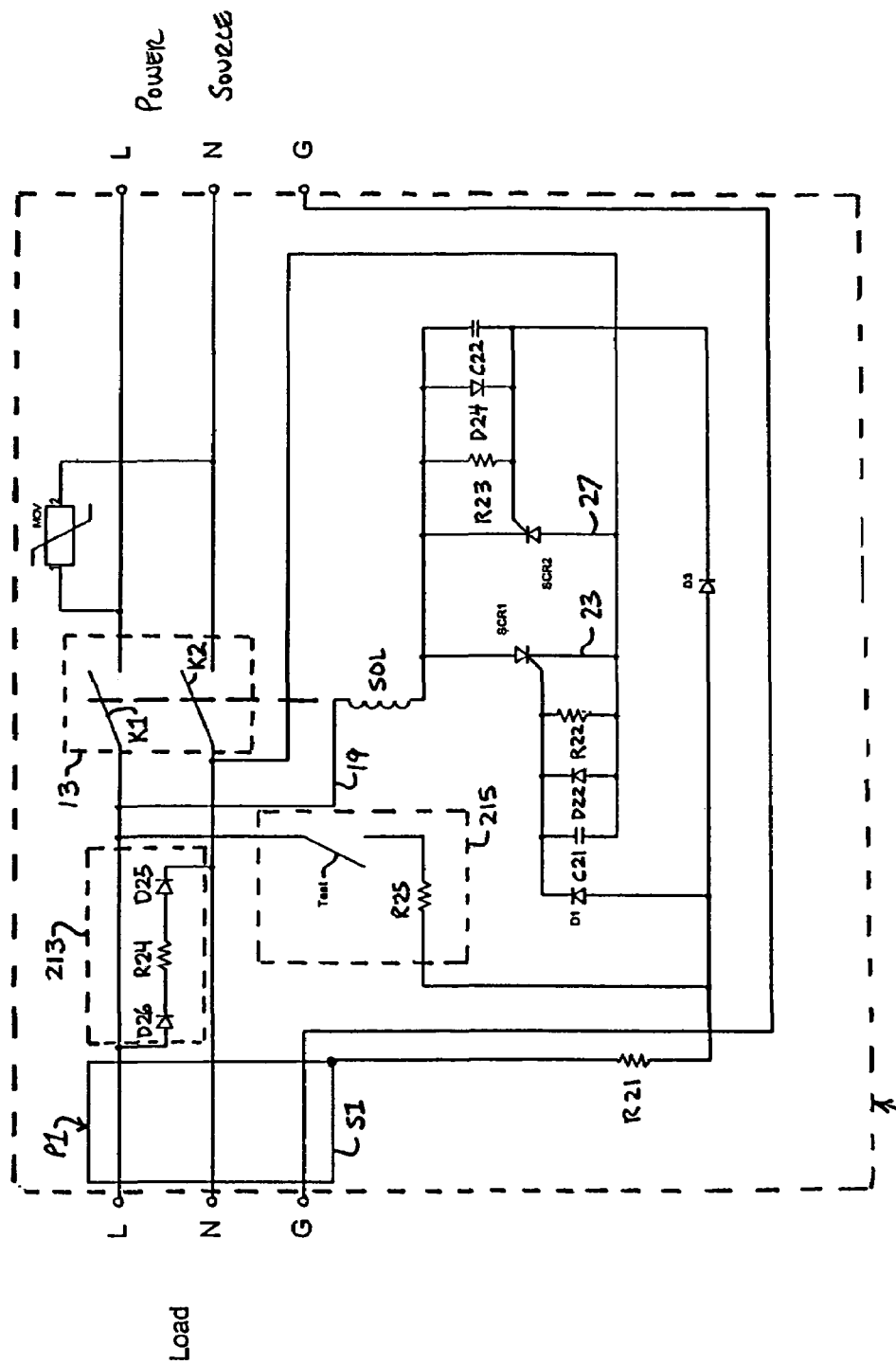
FIG. 4 is a schematic circuit diagram of a fourth embodiment of a fireguard circuit constructed according to the teachings of the present invention.

Referring now FIG. 4, there is shown a fourth embodiment of a fireguard circuit constructed according to the teachings of the present invention, the fireguard circuit being represented generally by reference numeral 311.

Fireguard circuit 311 is identical in all respects with fireguard circuit 211 with one notable exception: the power connections for solenoid SOL and the sensing circuitry are derived from the output side (i.e., the load) rather than from the input side (i.e., the power source). Specifically, second end 19 of winding 15 for solenoid SOL is connected to power line L at a location between sheath S1 and circuit breaker 13. In addition, cathode 23 of silicon controller rectifier SCR1 and anode 27 of silicon controlled rectifier SCR2 are connected to neutral line N at a location between sheath S1 and circuit breaker 13.

Figure 5:
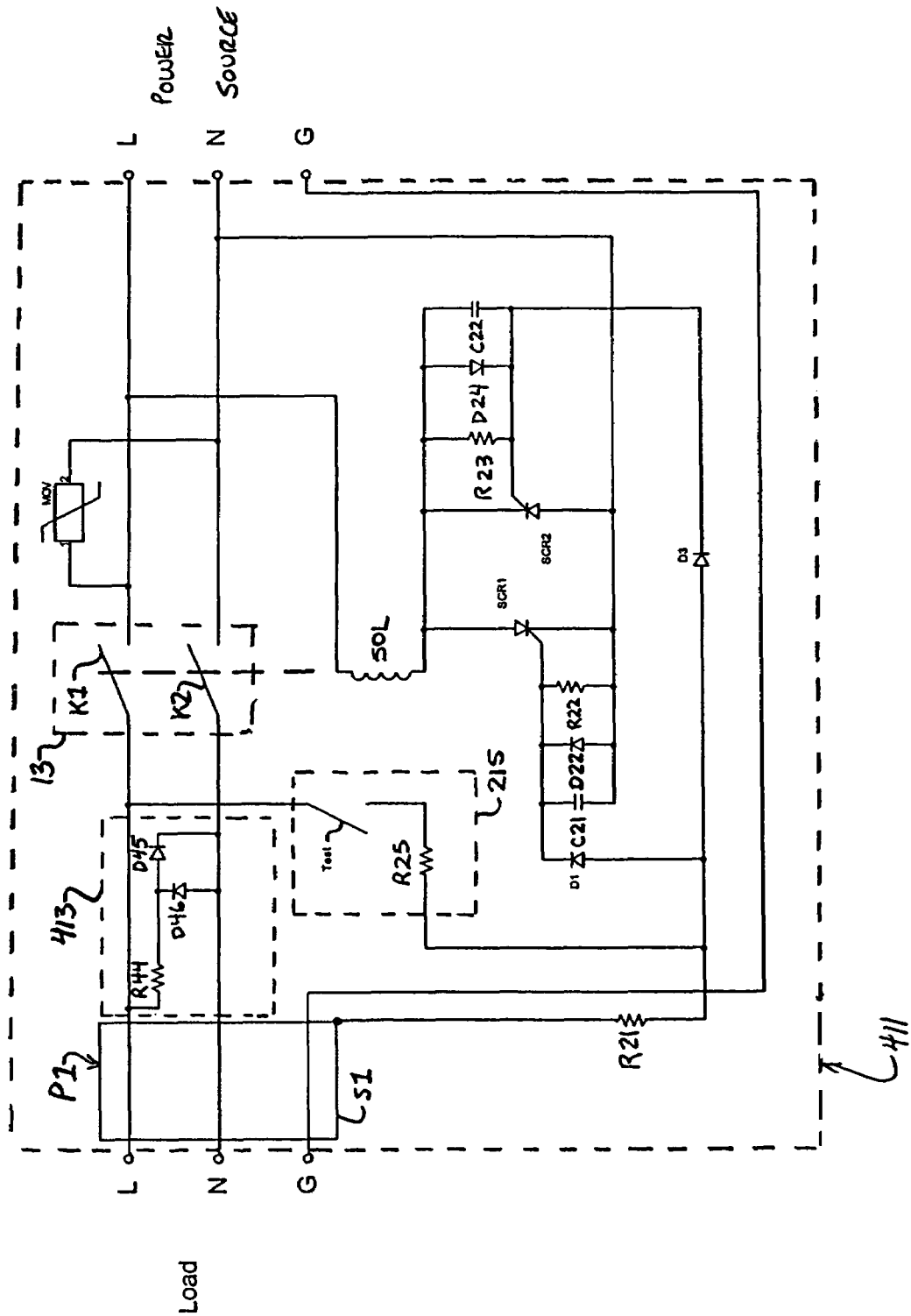
FIG. 5 is a schematic circuit diagram of a fifth embodiment of a fireguard circuit constructed according to the teachings of the present invention.

Referring now to FIG. 5, there is shown a fifth embodiment of a fireguard circuit constructed according to the teachings of the present invention, the fireguard circuit being represented generally by reference numeral 411.

Fireguard circuit 411 is identical in all respects with fireguard circuit 211 with the notable distinction being that fireguard circuit 411 includes an indicator circuit 413 (connecting power line L to neutral line N at a location between sheath S1 and circuit breaker 13) which differs slightly in construction from indicator circuit 213 in fireguard circuit 211. Specifically, indicator circuit 413 comprises a light emitting diode (LED) D45, a current limiting resistor R44 and a protection diode D46, with resistor R44 and LED D45 connected in series and with LED D45 and diode D46 connected in parallel. Preferably, current limiting resistor R44 has a value of approximately 68 Kohms and protection diode D46 has a model number of 1N4148. In use, indicator circuit 413 serves to provide a visual indication (i.e., a light) when power is being applied to the output of fireguard circuit 411 (i.e., the load).

Figure 6:
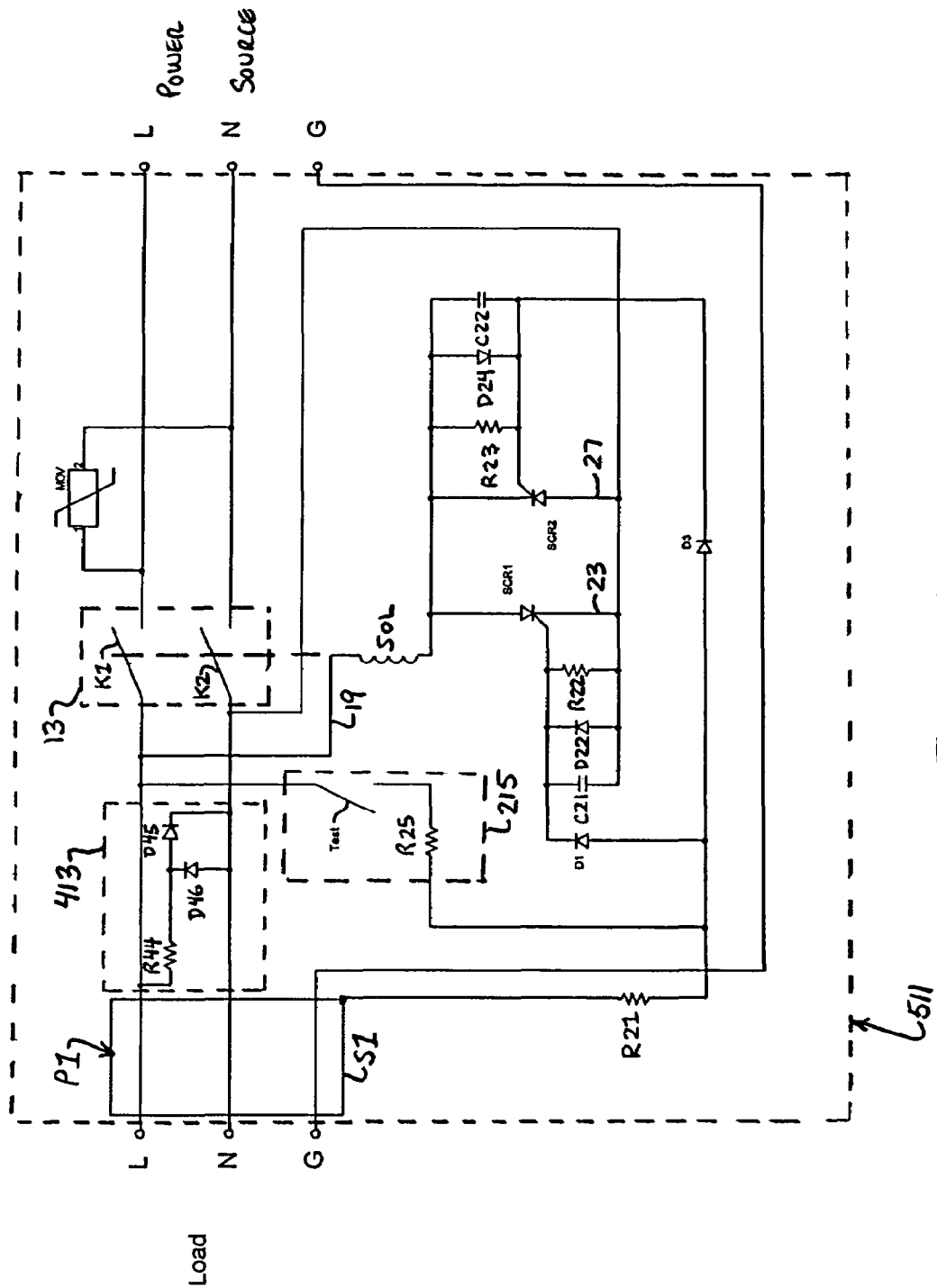
FIG. 6 is a schematic circuit diagram of a sixth embodiment of a fireguard circuit constructed according to the teachings of the present invention.

Referring now FIG. 6, there is shown a sixth embodiment of a fireguard circuit constructed according to the teachings of the present invention, the fireguard circuit being represented generally by reference numeral 511.

Fireguard circuit 511 is identical in all respects with fireguard circuit 411 with one notable exception: the power connections for solenoid SOL and the sensing circuitry are derived from the output side (i.e., the load) rather than from the input side (i.e., the power source). Specifically, second end 19 of winding 15 for solenoid SOL is connected to power line L at a location between sheath S1 and circuit breaker 13. In addition, cathode 23 of silicon controller rectifier SCR1 and anode 27 of silicon controlled rectifier SCR2 are connected to neutral line N at a location between sheath S1 and circuit breaker 13.

Figure 7:
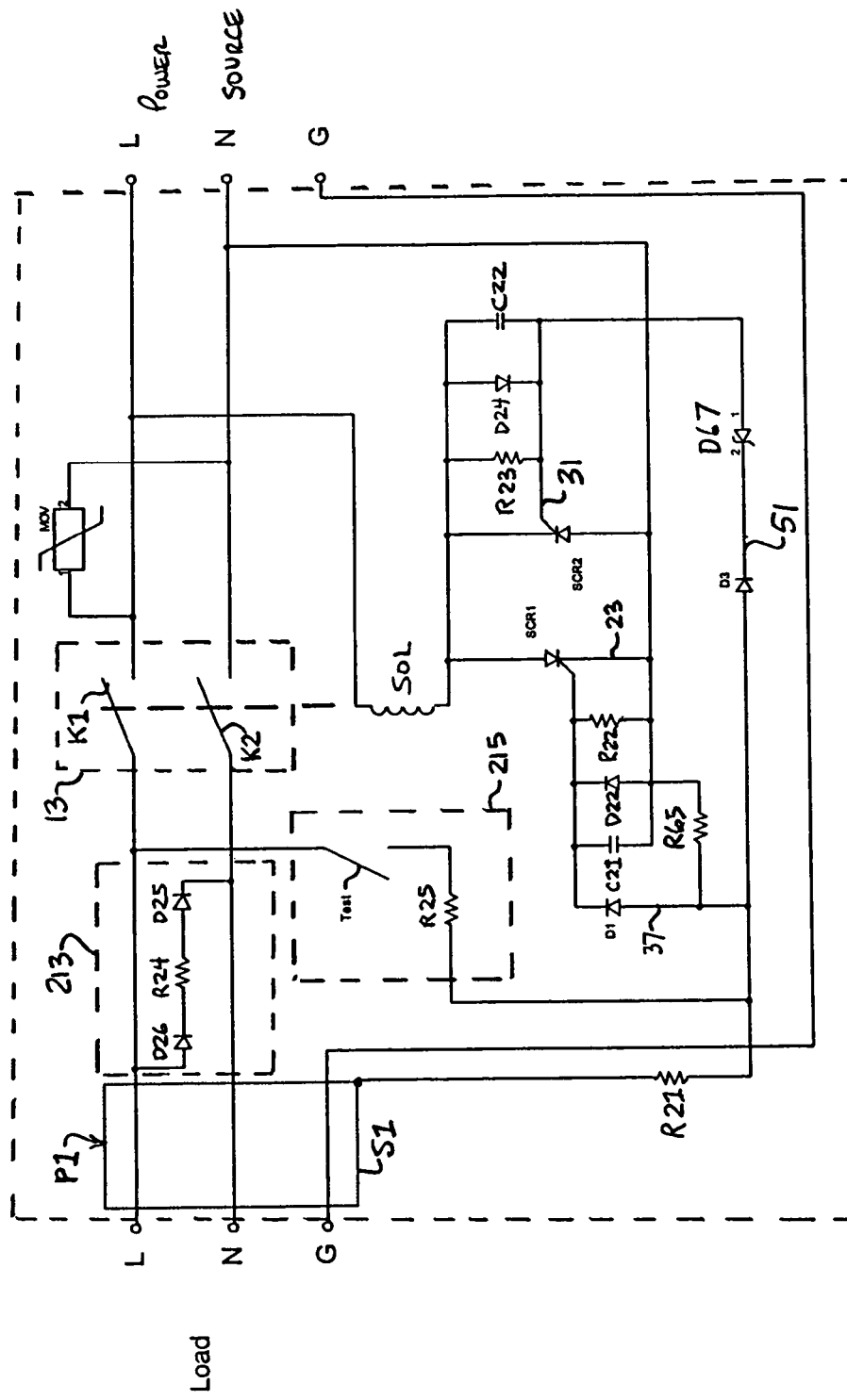
FIG. 7 is a schematic circuit diagram of a seventh embodiment of a fireguard circuit constructed according to the teachings of the present invention.

Referring now FIG. 7, there is shown a seventh embodiment of a fireguard circuit constructed according to the teachings of the present invention, the fireguard circuit being represented generally by reference numeral 611.

Fireguard circuit 611 is identical in all respects with fireguard circuit 211 with two notable exceptions: (1) fireguard circuit 611 additionally includes a zener diode D67 connected in series between cathode 51 of second isolation diode D3 and gate 31 of silicon controlled rectifier SCR2; and (2) fireguard circuit 611 additionally includes a resistor R65 having a value of approximately 100 Kohms which connects anode 37 of isolation diode D1 to cathode 23 of silicon controlled rectifier SCR1. In use, zener diode D67 is connected to gate 31 of rectifier SCR2 and serves to reduce the peak negative voltage applied to metal sheath S during the negative one half cycle of the line voltage (i.e., to reduce shield bias).

Figure 8:
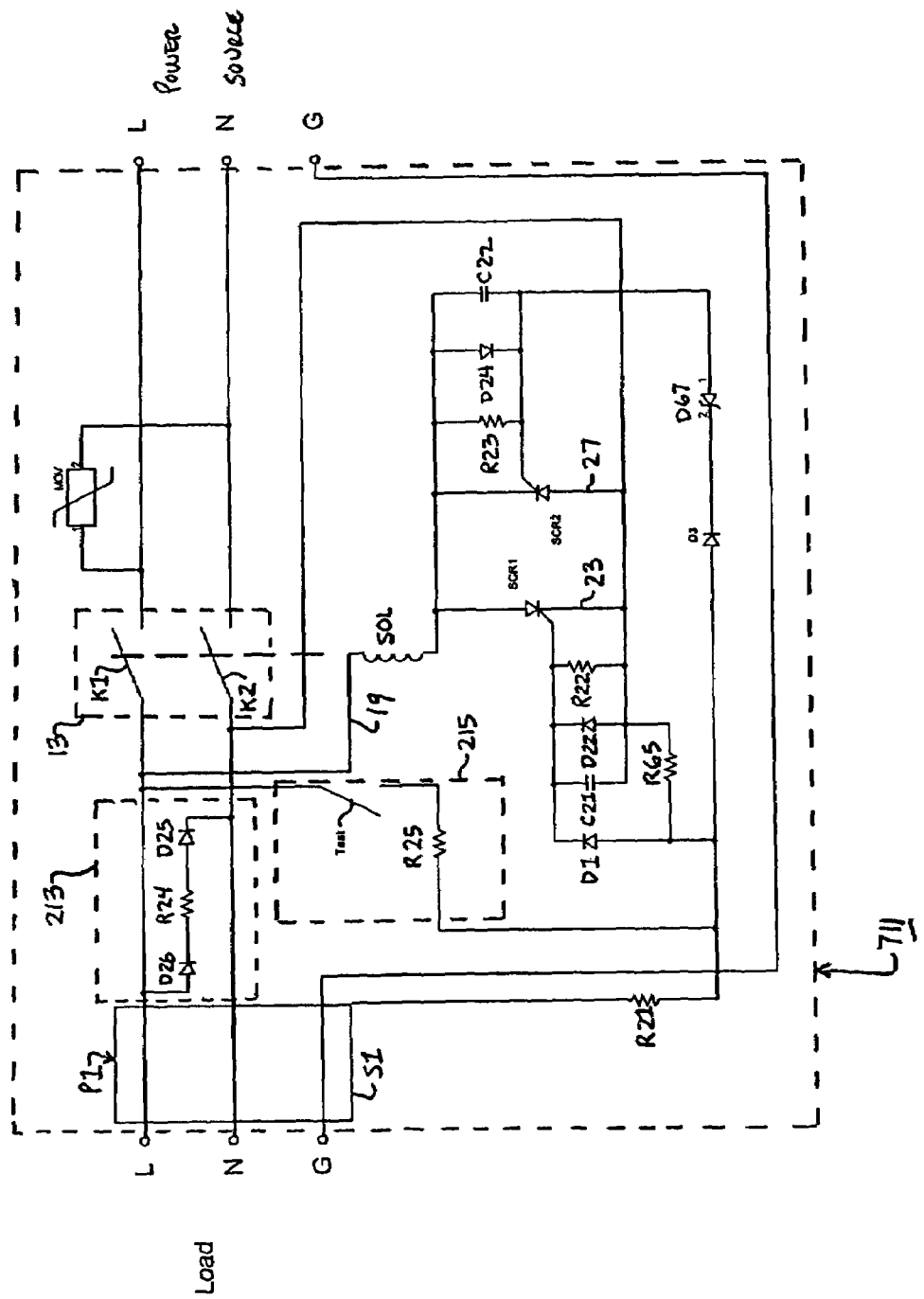
FIG. 8 is a schematic circuit diagram of an eighth embodiment of a fireguard circuit constructed according to the teachings of the present invention.

Referring now FIG. 8, there is shown an eighth embodiment of a fireguard circuit constructed according to the teachings of the present invention, the fireguard circuit being represented generally by reference numeral 711.

Fireguard circuit 711 is identical in all respects with fireguard circuit 611 with one notable exception: the power connections for solenoid SOL and the sensing circuitry are derived from the output side (i.e., the load) rather than from the input side (i.e., the power source). Specifically, second end 19 of winding 15 for solenoid SOL is connected to power line L at a location between sheath S1 and circuit breaker 13. In addition, cathode 23 of silicon controlled rectifier SCR1 and anode 27 of silicon controlled rectifier SCR2 are connected to neutral line N at a location between sheath S1 and circuit breaker 13.

Figure 9:
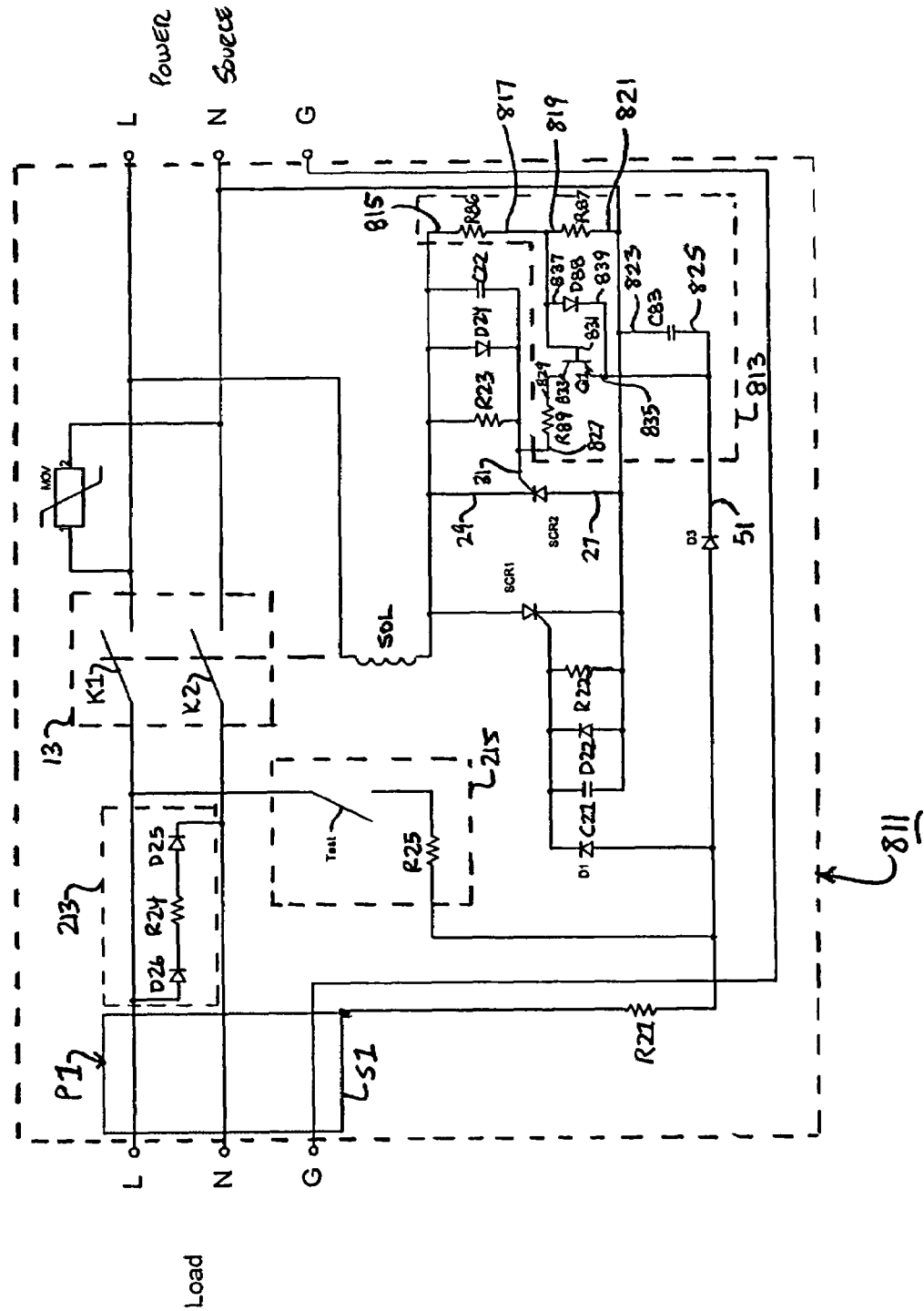
FIG. 9 is a schematic circuit diagram of a ninth embodiment of a fireguard circuit constructed according to the teachings of the present invention.

Referring now FIG. 9, there is shown a ninth embodiment of a fireguard circuit constructed according to the teachings of the present invention, the fireguard circuit being represented generally by reference numeral 811.

Fireguard circuit 811 is identical in all respects with fireguard circuit 211 with one notable exception: fireguard circuit 811 additionally includes a transistor circuit 813 connected to gate 31 of silicon controller rectifier SCR2. Specifically, transistor circuit 813 comprises a transistor Q1, resistors R87, R88 and R89, a capacitor C83 and a diode D88.

Resistor R86 has a value of approximately 100 Kohms and includes a first terminal 815 connected to cathode 29 of silicon controller rectifier SCR2 and a second terminal 817. Resistor R87 has a value of approximately 3.9 Kohms and includes a first terminal 819 connected to terminal 817 of resistor R86 and a second terminal 821 connected to anode 27 of silicon controlled rectifier SCR2. Capacitor C83 has a value of approximately 0.1 uF and includes a first terminal 823 connected to anode 27 of silicon controlled rectifier SCR2 and a second terminal 825 connected to cathode 51 of isolation diode D3. Resistor R89 has a value of approximately 1 Kohm and includes a first terminal 827 connected to gate 31 of second silicon controlled rectifier SCR2 and a second terminal 829. Transistor Q1 includes a base 831 connected to terminal 819 of resistor R87, a collector 833 connected to terminal 829 of resistor R89 and an emitter 835 connected to cathode 51 of isolation diode D3. Diode D88 preferably has a model number of IN4148 includes an anode 837 connected to base 831 of transistor Q1 and a cathode 839 connected to emitter 835 of transistor Q1.

In use, disposing transistor circuit 813 between gate 31 of second silicon controlled rectifier SCR2 and sheath S1 serves two principal purposes: (1) to allow metal sheath S1 to be biased at a low peak voltage and (2) to detect arcing or shorting between sheath S1 and neutral line N and, in response thereto, provide a corresponding signal to second silicon controlled rectifier SCR2.

Figure 10:
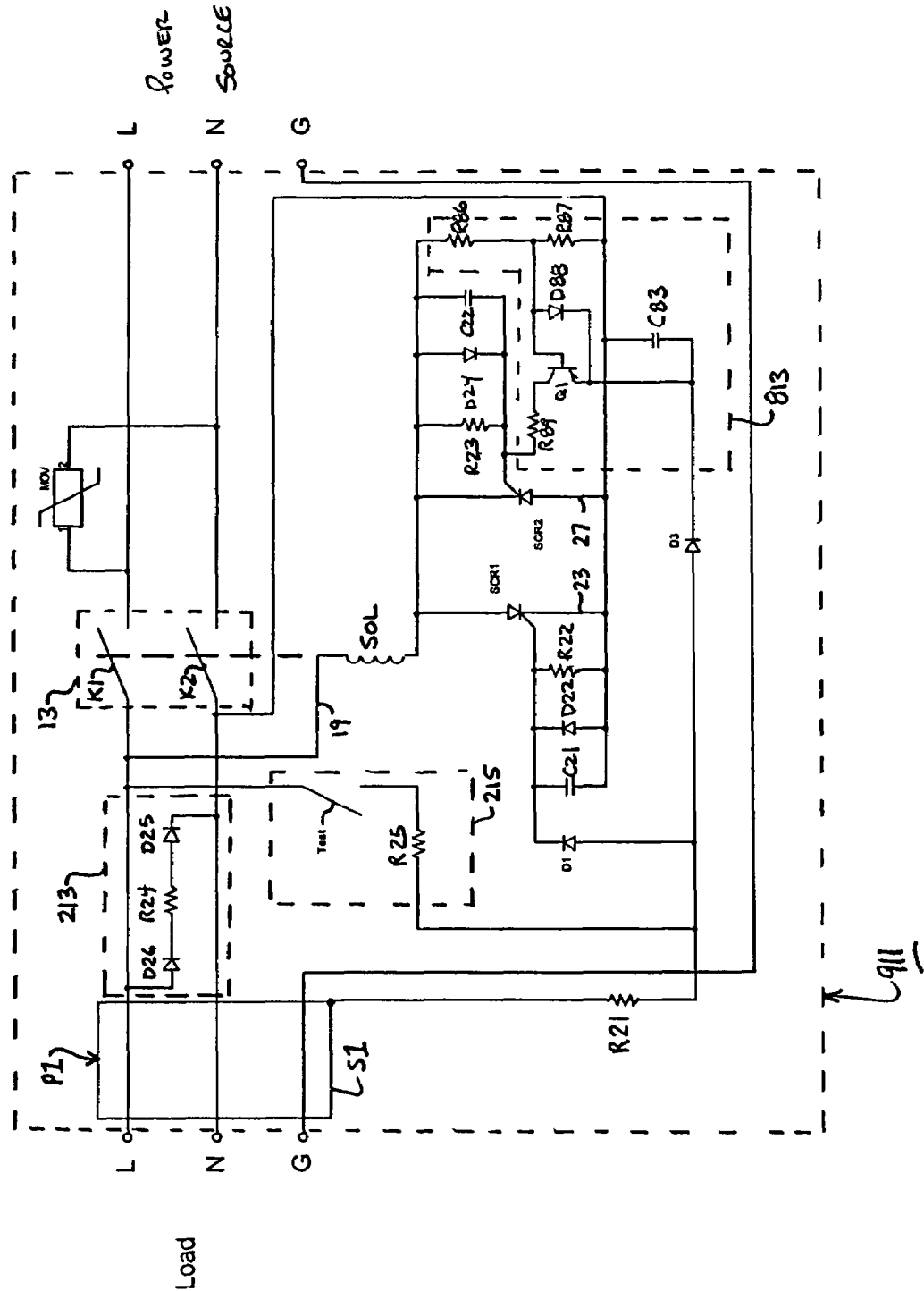
FIG. 10 is a schematic circuit diagram of a tenth embodiment of a fireguard circuit constructed according to the teachings of the present invention.

Referring now FIG. 10, there is shown a tenth embodiment of a fireguard circuit constructed according to the teachings of the present invention, the fireguard circuit being represented generally by reference numeral 911.

Fireguard circuit 911 is identical in all respects with fireguard circuit 811 with one notable exception: the power connections for solenoid SOL and the sensing circuitry are derived from the output side (i.e., the load) rather than from the input side (i.e., the power source). Specifically, second end 19 of winding 15 for solenoid SOL is connected to power line L at a location between sheath S1 and circuit breaker 13. In addition, cathode 23 of silicon controller rectifier SCR1 and anode 27 of silicon controlled rectifier SCR2 are connected to neutral line N at a location between sheath S1 and circuit breaker 13.

Figure 11:
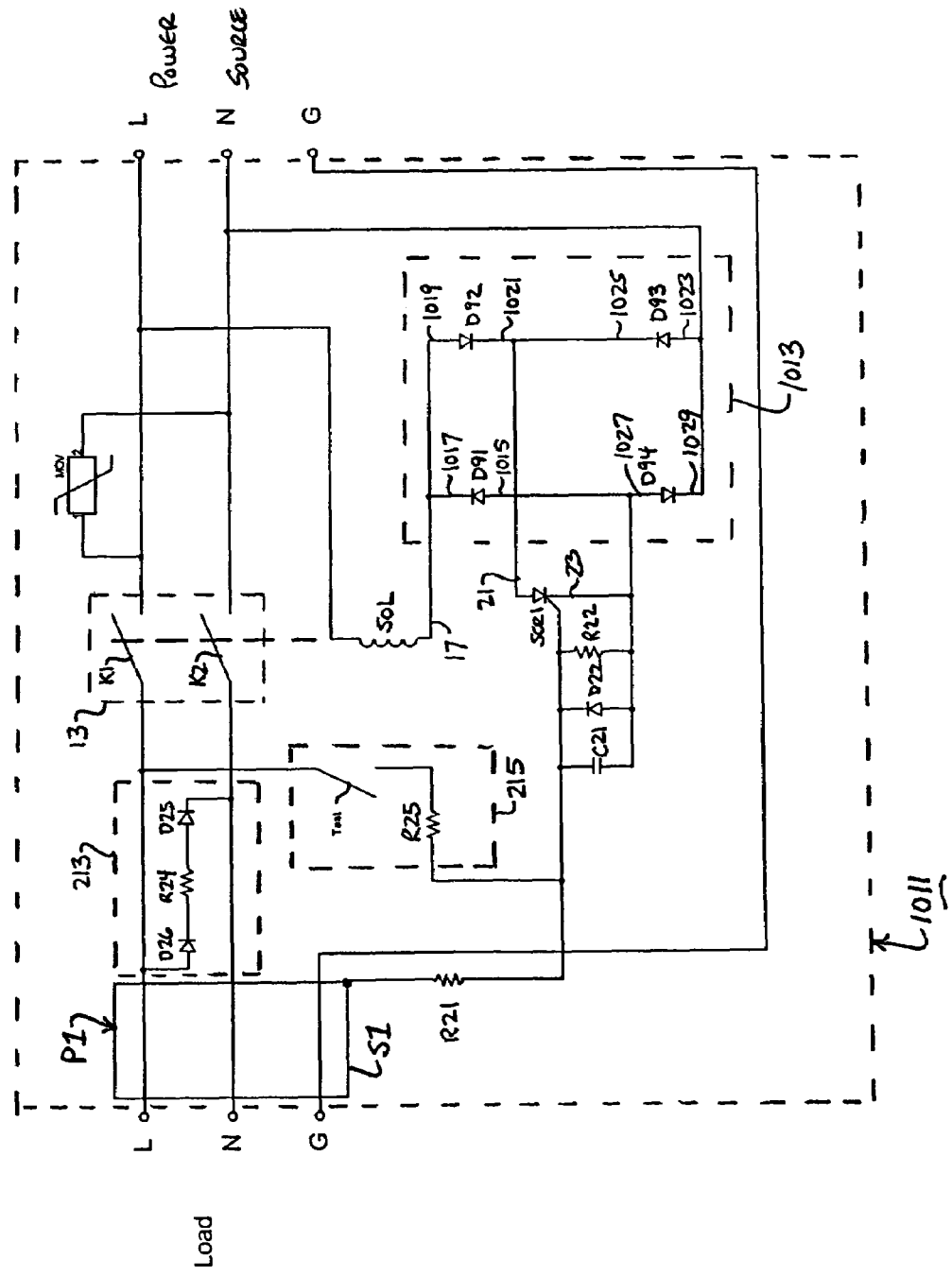
FIG. 11 is a schematic circuit diagram of an eleventh embodiment of a fireguard circuit constructed according to the teachings of the present invention.

Referring now FIG. 11, there is shown an eleventh embodiment of a fireguard circuit constructed according to the teachings of the present invention, the fireguard circuit being represented generally by reference numeral 1011.

Fireguard circuit 1011 is substantially similar in construction to fireguard circuit 211. The principal distinction between fireguard circuit 1011 and fireguard circuit 211 is that fireguard circuit 1011 includes a diode bridge 1013 in place of second silicon controlled rectifier SCR2. Diode bridge 1013 comprises four diodes D91, D92, D93 and D94, each diode preferably having a model number of IN4004. Diode D91 includes an anode 1015 connected to cathode 23 of silicon controlled rectifier SCR1 and a cathode 1017 connected to first end 17 of solenoid SOL. Diode D92 includes an anode 1019 connected to cathode 1017 of diode D91 and a cathode 1021 connected to anode 21 of silicon controlled rectifier SCR1. Diode D93 includes an anode 1023 connected to neutral line N at the power source and a cathode 1025 connected to anode 21 of silicon controlled rectifier SCR1. Diode D94 includes an anode 1027 connected to cathode 23 of silicon controlled rectifier SCR1 and a cathode 1029 connected to neutral line N at the power source.

In use, diode bridge 1013 in fireguard circuit 1011 performs substantially the same function as second silicon controlled rectifier SCR2 in fireguard circuit 211. Namely, diode bridge 1013 acts to detect the presence of an arcing condition between neutral line N and metal sheath S1 and to switch solenoid SOL from its de-energized state to its energized state upon detecting the presence of the arcing condition between neutral line N and metal sheath S1.

Figure 12:
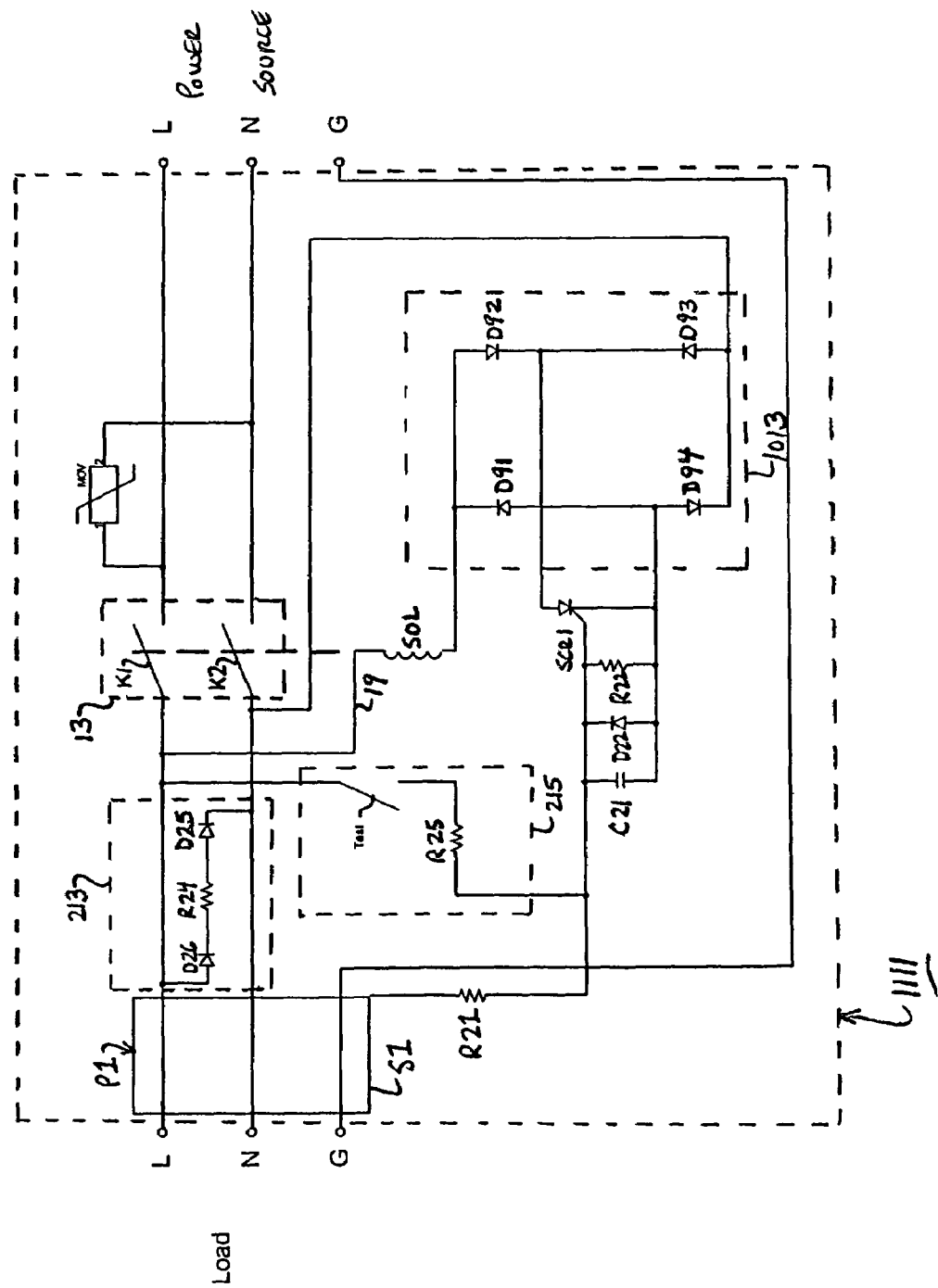
FIG. 12 is a schematic circuit diagram of a twelfth embodiment of a fireguard circuit constructed according to the teachings of the present invention.

Referring now FIG. 12, there is shown a twelfth embodiment of a fireguard circuit constructed according to the teachings of the present invention, the fireguard circuit being represented generally by reference numeral 1111.

Fireguard circuit 1111 is identical in all respects with fireguard circuit 1011 with one notable exception: the power connections for solenoid SOL and the sensing circuitry are derived from the output side (i.e., the load) rather than from the input side (i.e., the power source). Specifically, second end 19 of winding 15 for solenoid SOL is connected to power line L at a location between sheath S1 and circuit breaker 13. In addition, anode 1023 of diode D93 and cathode 1029 of diode D94 are connected to neutral line N at a location between sheath S1 and circuit breaker 13.

Figure 13:
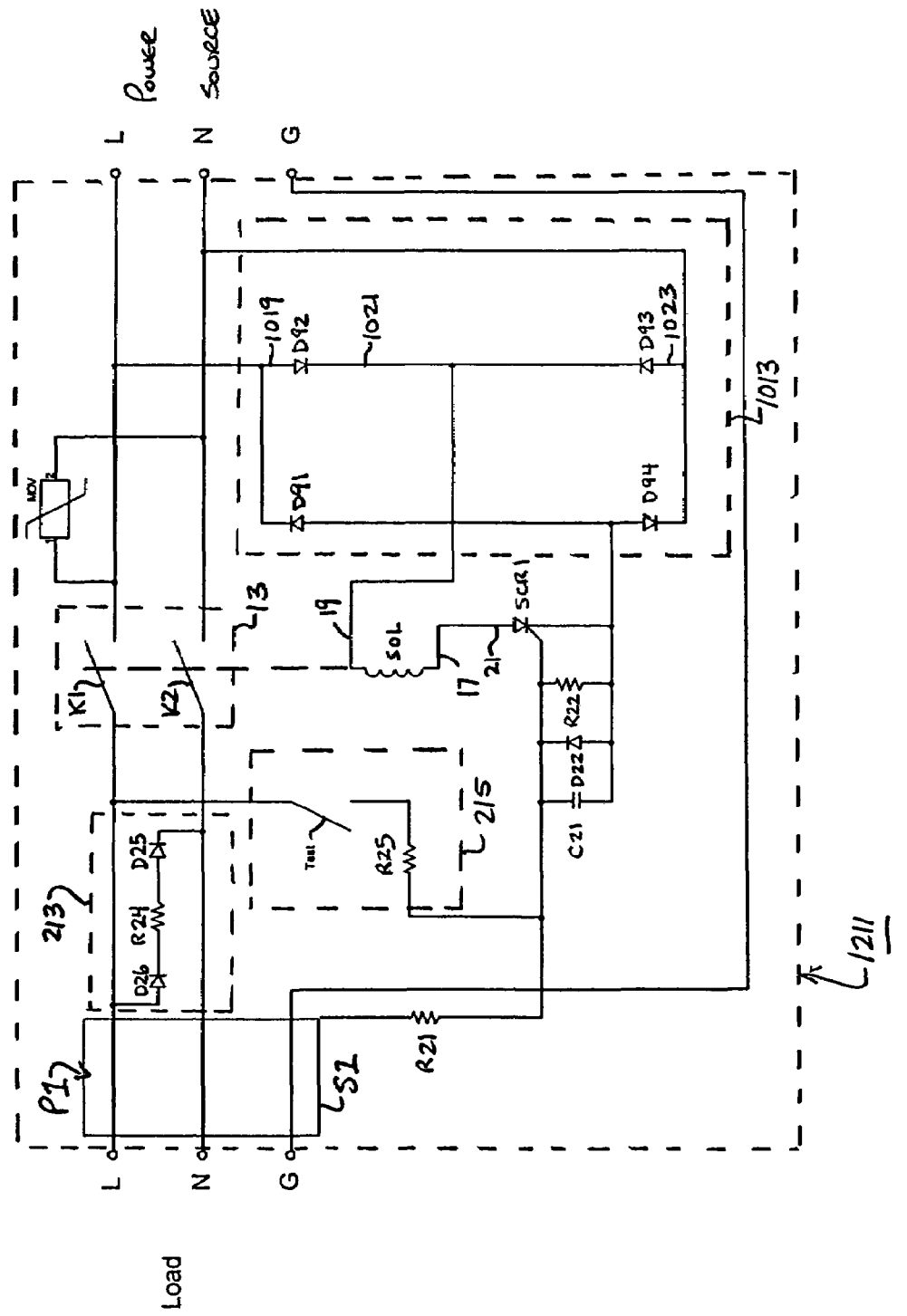
FIG. 13 is a schematic circuit diagram of a thirteenth embodiment of a fireguard circuit constructed according to the teachings of the present invention.

Referring now FIG. 13, there is shown a thirteenth embodiment of a fireguard circuit constructed according to the teachings of the present invention, the fireguard circuit being represented generally by reference numeral 1211.

Fireguard circuit 1211 is substantially similar in construction to fireguard circuit 1011. The principal distinction between fireguard circuit 1211 and fireguard circuit 1011 is that, in fireguard circuit 1211, solenoid SOL is connected directly to silicon controlled rectifier SCR1 whereas, in fireguard circuit 1011, solenoid SOL is connected indirectly to silicon controlled rectifier SCR1 through diode bridge 1013. Specifically, in fireguard circuit 1211, first end 17 of the winding for solenoid SOL is connected to anode 21 of silicon controlled rectifier SCR1 and second end 19 of the winding for solenoid SOL is connected to cathode 1021 of diode D92. Furthermore, diode bridge 1013 is directly connected to the input side (i.e., the power source) of power line L and neutral line N, with anode 1019 of diode D92 connected to power line L at the power source and anode 1023 of diode D93 connected to neutral line N at the power source.

Figure 14:
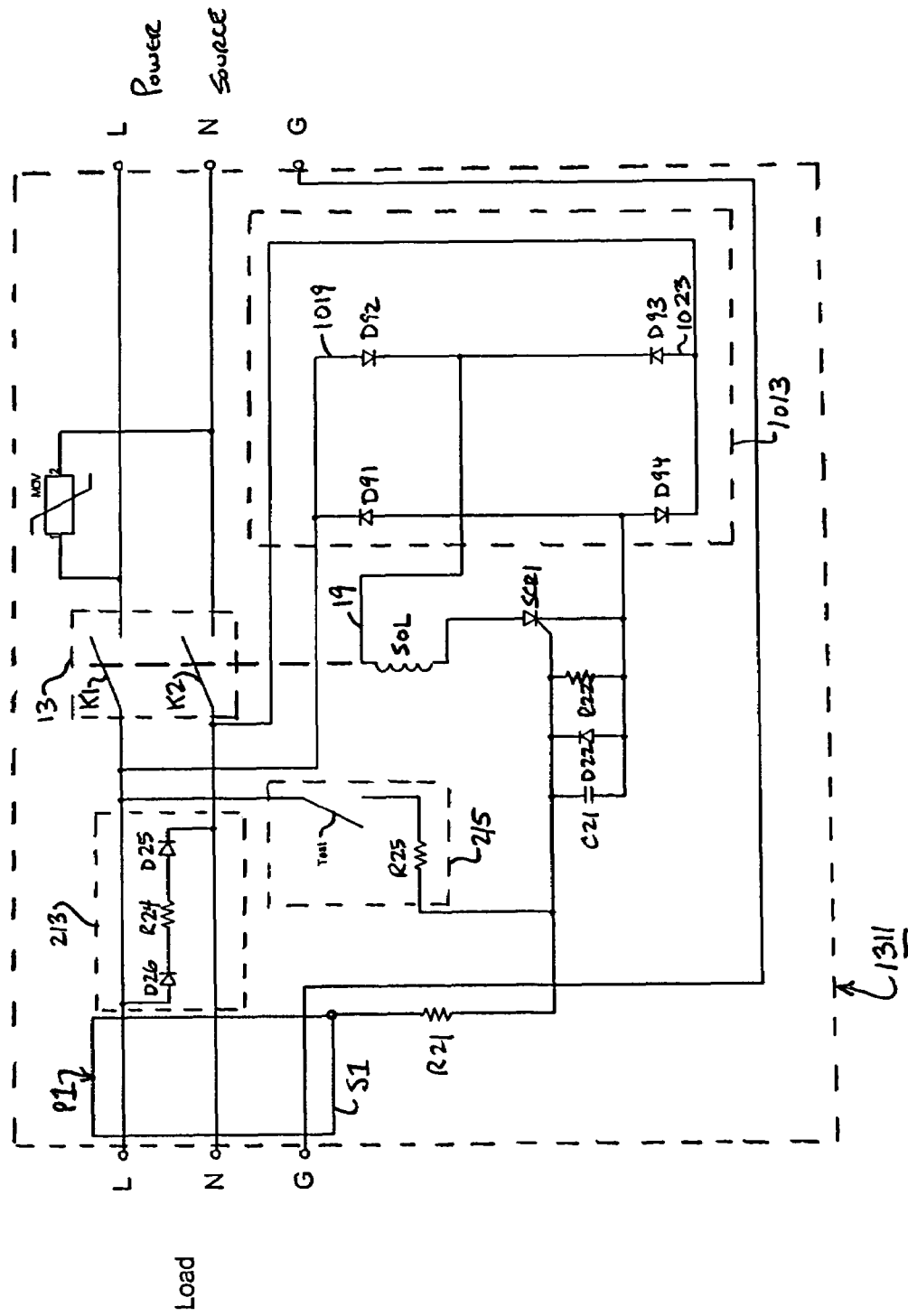
FIG. 14 is a schematic circuit diagram of a fourteenth embodiment of a fireguard circuit constructed according to the teachings of the present invention

Referring now FIG. 14, there is shown a fourteenth embodiment of a fireguard circuit constructed according to the teachings of the present invention, the fireguard circuit being represented generally by reference numeral 1311.

Fireguard circuit 1311 is identical in all respects with fireguard circuit 1211 with one notable exception: the power connections for diode bridge 1013 are derived from the output side (i.e., the load) rather than from the input side (i.e., the power source). Specifically, anode 1019 of diode D92 is connected to power line L at its output side and anode 1023 of diode D93 is connected to neutral line N at its output side.

Figure 15:
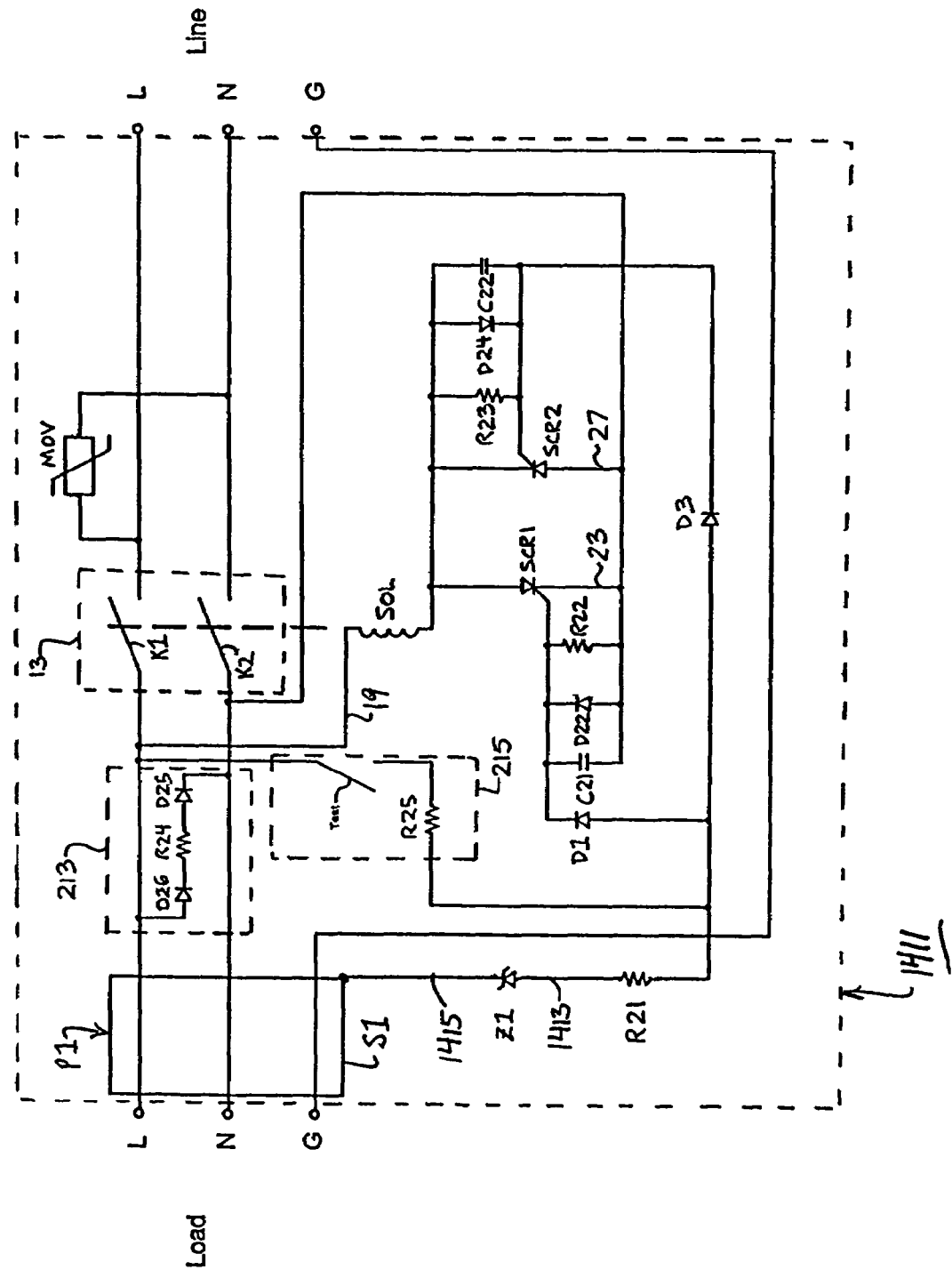
FIG. 15 is a schematic circuit diagram of an fifteenth embodiment of a fireguard circuit constructed according to the teachings of the present invention.

Referring now to FIG. 15, there is shown a fifteenth embodiment of a fireguard circuit constructed according to the teachings of the present invention, the fireguard circuit being represented generally by reference numeral 1411.

Fireguard circuit 1411 is identical in all respects with fireguard circuit 211 with two notable distinctions.

As a first distinction from fireguard circuit 211, fireguard circuit 1411 additionally includes a zener diode Z1 connected in series between sheath S1 and voltage dropping resistor R21. Zener diode Z1 is preferably a 68 volt zener diode which includes an anode 1413 connected to voltage dropping resistor R21 and a cathode 1415 connected to sheath SI. In use, zener diode Z1 is connected in series with sheath S1 and first and second silicon controlled rectifiers SCR1 and SCR2 in order to reduce the peak voltage applied to metal sheath (i.e., to reduce shield bias).

As a second distinction from fireguard circuit 211, fireguard circuit 1411 derives its power connections for solenoid SOL and the sensing circuitry from the output side (i.e., the load) rather than from the input side (i.e., the power source). Specifically, second end 19 of winding 15 for solenoid SOL is connected to power line L at a location between sheath S1 and circuit breaker 13. In addition, cathode 23 of silicon controlled rectifier SCR1 and anode 27 of silicon controlled rectifier SCR2 are connected to neutral line N at a location between sheath S1 and circuit breaker 13.

Figure 16:
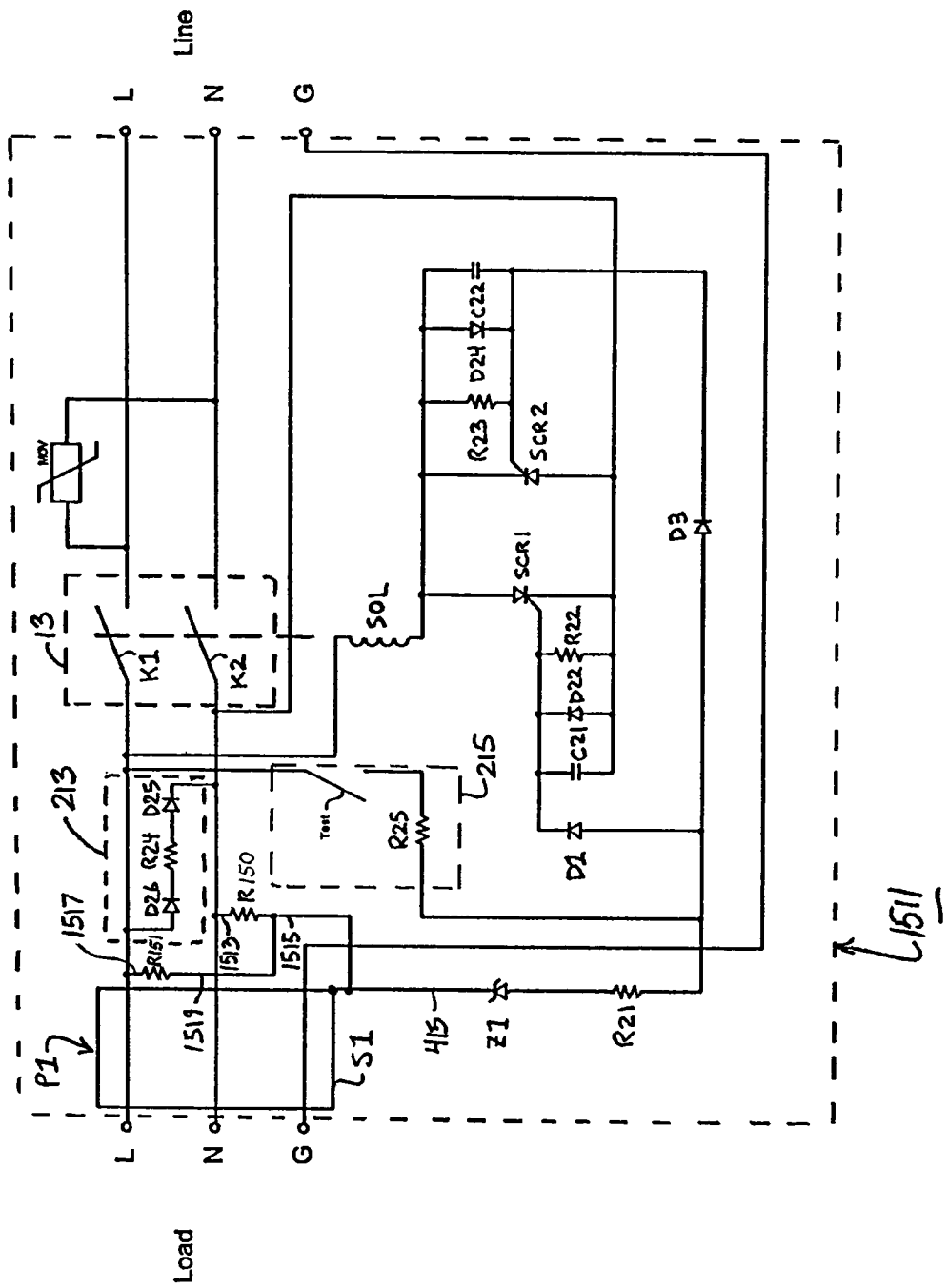
FIG. 16 is a schematic circuit diagram of a sixteenth embodiment of a fireguard circuit constructed according to the teachings of the present invention.

Referring now FIG. 16, there is shown a sixteenth embodiment of a fireguard circuit constructed according to the teachings of the present invention, the fireguard circuit being represented generally by reference numeral 1511.

Fireguard circuit 1511 is identical in all respects with fireguard circuit 1411 with one notable exception: fireguard circuit 1511 additionally includes first and second shield bias resistors R150 and R151. Resistor R150 preferably has a value of 39 Kohms and includes a first terminal 1513 and a second terminal 1515, first terminal 1513 being connected to neutral line N at a location between sheath S1 and circuit breaker 13 and second terminal 1515 being connected directly to sheath S1. Resistor R151 preferably has a value of 39 Kohms and includes a first terminal 1517 and a second terminal 1519, first terminal being connected to power line L at a location between sheath S1 and circuit breaker 13 and second terminal 1519 being connected to second terminal 1515 of resistor R150. Together, resistors R150 and R151 serve to bias sheath S1 to a particular voltage.

Figure 17:
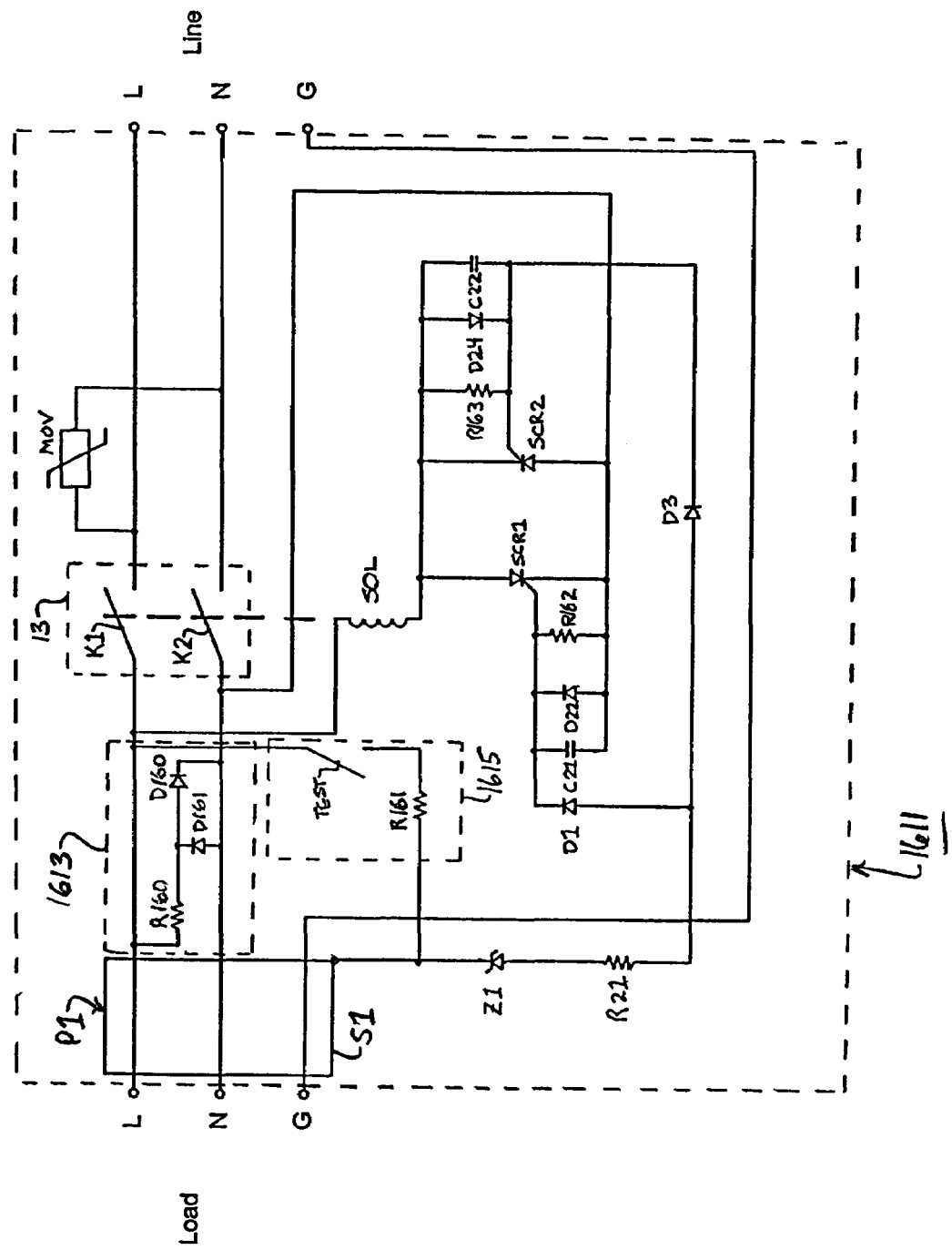
FIG. 17 is a schematic circuit diagram of a seventeenth embodiment of a fireguard circuit constructed according to the teachings of the present invention.

Referring now FIG. 17, there is shown a seventeenth embodiment of a fireguard circuit constructed according to the teachings of the present invention, the fireguard circuit being represented generally by reference numeral 1611.

Fireguard circuit 1611 is identical in all respects with fireguard circuit 1411 with three notable distinctions.

As a first distinction from fireguard circuit 1411, fireguard circuit 1611 includes an indicator circuit 1613 (connecting power line L to neutral line N at a location between sheath S1 and circuit breaker 13) which differs slightly in construction from indicator circuit 213 in fireguard circuit 1411. Specifically, indicator circuit 1613 comprises a light emitting diode (LED) D160, a current limiting resistor R160 and a protection diode D161, with LED D160 and resistor R160 connected in series between power line L and neutral line N and with protection diode D161 connected in parallel with LED D160 (in reverse polarity). Preferably, current limiting resistor R160 has a value of 68 Kohms and protection diode D161 has a model number of 1N4148. In use, indicator circuit 1613 serves to provide a visual indication (i.e., a light) when power is being applied to the output of fireguard circuit 1611 (i.e., the load).

As a second distinction from fireguard circuit 1411, fireguard circuit 1611 includes a test circuit 1615 which differs slightly from test circuit 215 in fireguard circuit 1411 in its construction and its connection to the remainder of fireguard circuit 1611. Specifically, test circuit 1615 is connected, at one end, to power line L at a location between sheath S1 and circuit breaker 13 and, at the other end, to sheath S1. Test circuit 1615 comprises a test switch TEST and a resistor R161 which are connected in series. Preferably, resistor R161 has a value of approximately 15 Kohms. In use, test circuit 1615 allows the user to test whether fireguard circuit 1611 is operating properly.

As a third distinction, the preferred value of selected components in fireguard circuit 1411 are modified slightly in fireguard circuit 1611. Specifically, resistors R22 and R23 in fireguard circuit 1411 are replaced with resistors R162 and R163 in fireguard circuit 1611, each of resistors R62 and R63 having a value of approximately 680 ohms.

Figure 18:
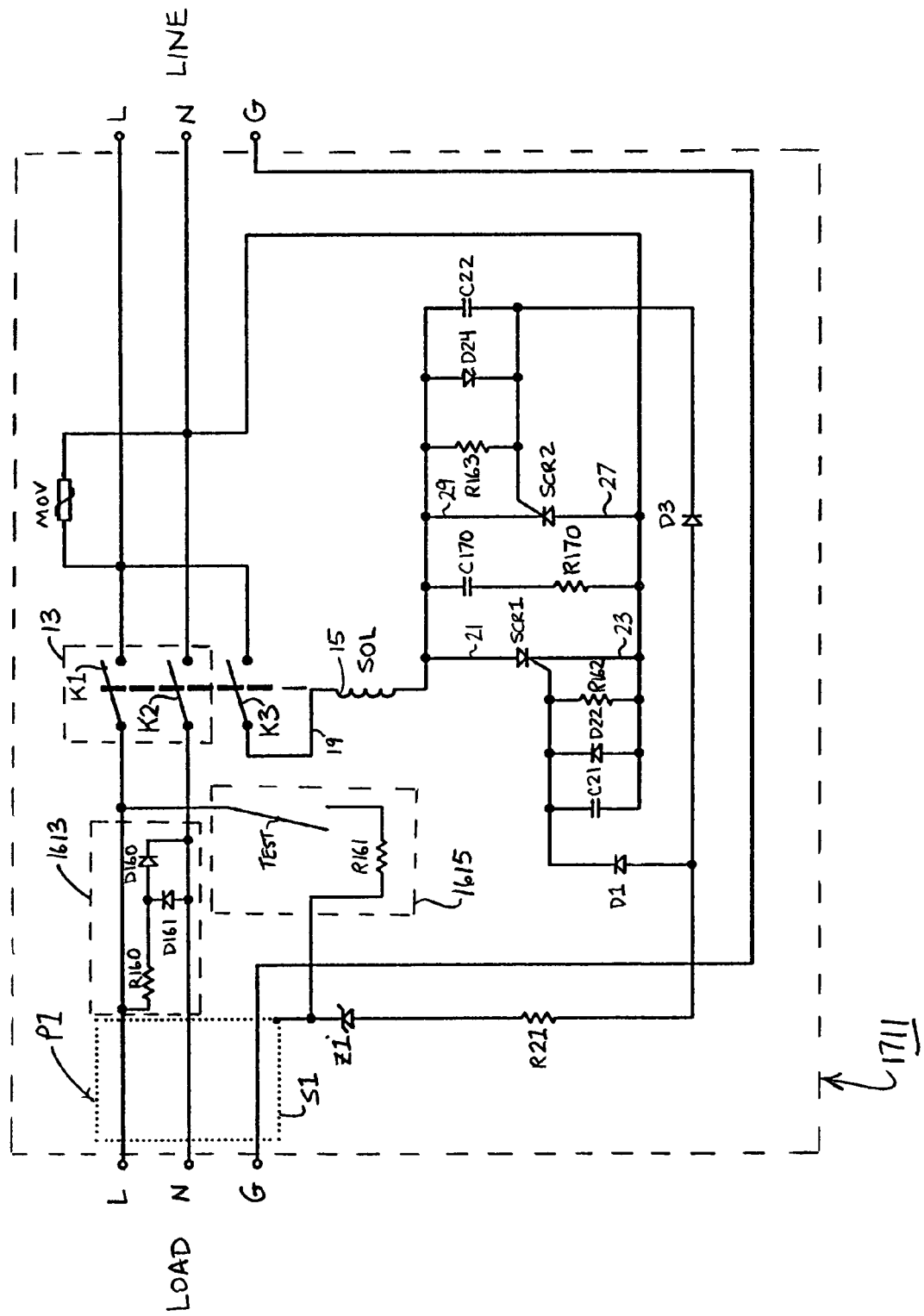
FIG. 18 is a schematic circuit diagram of an eighteenth embodiment of a fireguard circuit constructed according to the teachings of the present invention.

Referring now FIG. 18, there is shown an eighteenth embodiment of a fireguard circuit constructed according to the teachings of the present invention, the fireguard circuit being represented generally by reference numeral 1711.

Fireguard circuit 1711 is identical in all respects with fireguard circuit 1611 with three notable distinctions.

As a first distinction from fireguard circuit 1611, fireguard circuit 1711 additionally includes a capacitor C170 and a resistor R170 which are connected in series, one end of which is connected to anode 21 of first silicon controlled rectifier SCR1 and the other end of which is connected to cathode 23 of first silicon controlled rectifier SCR1. Capacitor C170 preferably has a value of 0.01 uF and resistor R170 preferably has a value of 1.0 Kohms. Together, capacitor C170 and resistor R170 ensure that fireguard circuit 1711 is compliant with UL performance tests for unwanted tripping (i.e., ring wave) and surging in accordance with UL Standard 1699.

As a second distinction from fireguard circuit 1611, the power connections for solenoid SOL and the sensing circuitry in fireguard circuit 1711 are derived from the input side (i.e., the line) rather than from the output side (i.e., the load). Specifically, second end 19 of winding 15 for solenoid SOL is connected to power line L at a location between the line and circuit breaker 13. In addition, anode 27 for silicon controller rectifier SCR2 (as well as cathode 23 for silicon controlled rectifier SCR1) is connected to neutral line N at a location between the line and circuit breaker 13.

As a third distinction from fireguard circuit 1611, fireguard circuit 1711 additionally includes a third normally-closed switch K3 which is located in the line which connects second end 19 of winding 15 to the power line L. Solenoid SOL is ganged to third normally-closed switch K3. As a result, solenoid SOL is responsible for selectively controlling the connective position of switches K1, K2 and K3. Specifically, when solenoid SOL is de-energized, switches K1, K2 and K3 remain in their closed positions. However, when solenoid SOL is energized, solenoid SOL moves and maintains switches K1, K2 and K3 into their open positions.

It should be noted that, because solenoid SOL is powered from the line side, solenoid SOL is susceptible to overheating and/or burning when metal sheath S1 is shorted (i.e., connected) to ground G, which is highly undesirable. Accordingly, it is to be understood that the function of switch K3 is to prevent solenoid SOL from overheating and/or burning by opening (i.e., terminating) the supply of power to solenoid SOL from power line L during such a condition.

Figure 19:
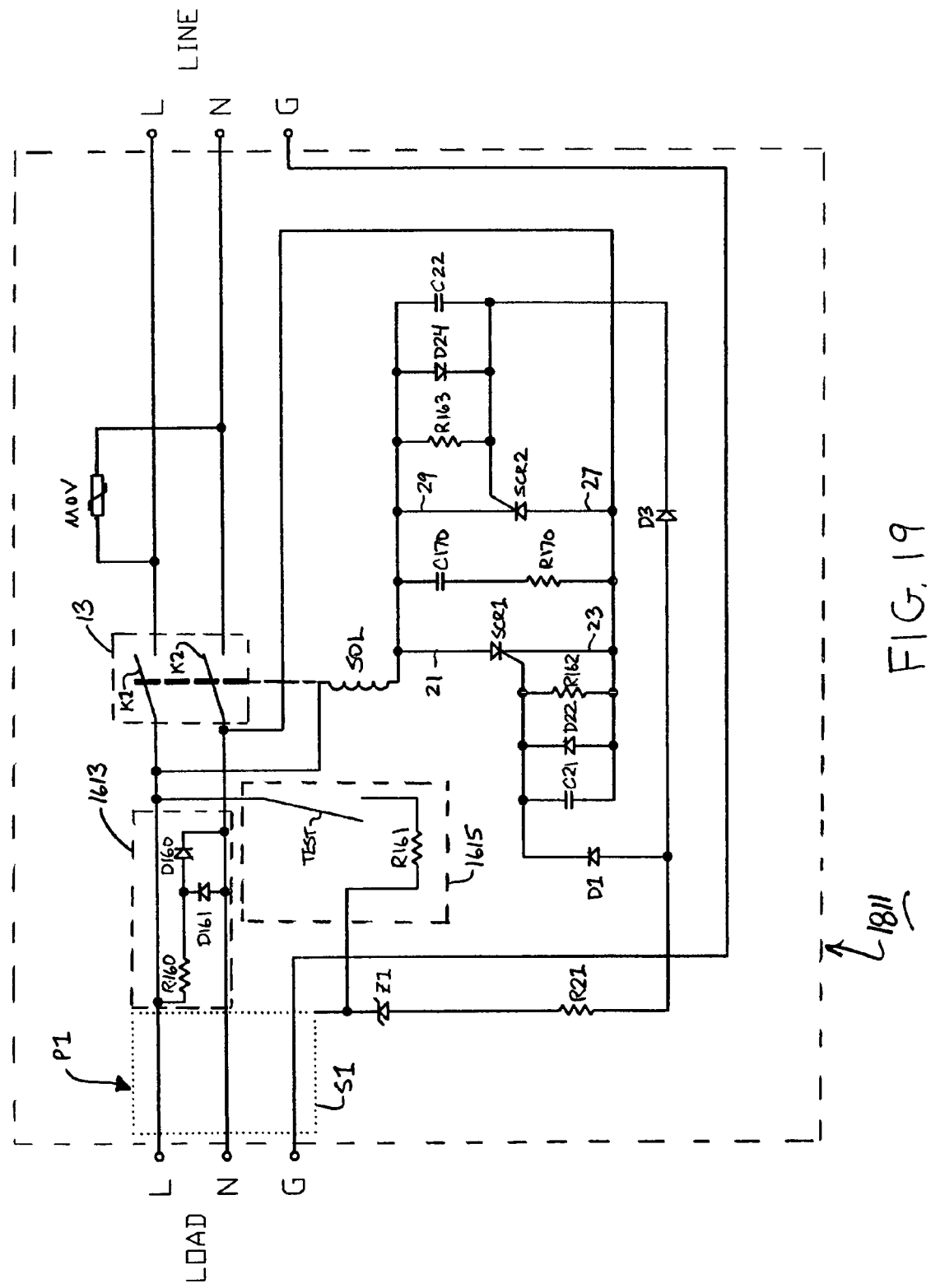
FIG. 19 is a schematic circuit diagram of a nineteenth embodiment of a fireguard circuit constructed according to the teachings of the present invention.

Referring now FIG. 19, there is shown a nineteenth embodiment of a fireguard circuit constructed according to the teachings of the present invention, the fireguard circuit being represented generally by reference numeral 1811.

Fireguard circuit 1811 is identical in all respects with fireguard circuit 1611 with one notable distinction. Specifically, fireguard circuit 1811 additionally includes a capacitor C170 and a resistor R170 which are connected in series, one end of which is connected to anode 21 of first silicon controlled rectifier SCR1 and the other end of which is connected to cathode 23 of first silicon controlled rectifier SCR1. Capacitor C170 preferably has a value of 0.01 uF and resistor R170 preferably has a value of 1.0 Kohms. Together, capacitor C170 and resistor R170 ensure that fireguard circuit 1811 is compliant with UL performance tests for unwanted tripping (i.e., ring wave) and surging in accordance with UL Standard 1699.

The versions of the present invention described above are intended to be merely exemplary and those skilled in the art shall be able to make numerous variations and modifications to it without departing from the spirit of the present invention. For example, although the majority of the fireguard circuits described in detail above are shown for use as a safety device for a power cable which comprises three conducting lines, it is to be understood that these fireguard circuits could also be used as a safety device for a power cable which comprises two conducting lines without departing from the spirit of the present invention. All such variations and modifications are intended to be within the scope of the present invention as defined in the appended claims. For example, it should be noted that the particular components which make up the aforementioned embodiments may be interchanged or combined to form additional embodiments.

What is claimed is:

1. A fireguard circuit for use as a safety device for a power cable, said power cable connecting a power source with a load, said power cable comprising a power line, a neutral line and a metal sheath which surrounds the power line and the neutral line, said fireguard circuit comprising:
   (a) a circuit breaker comprising a first switch located in one of said lines between the power source and the load, said switch having a first position in which the power source in its associated line is connected to the load and a second position in which the power source in its associated line is not connected to the load,
   (b) a circuit opening device for setting said switch in either its first position or its second position, said circuit opening device being operable in either a first state or a second state, said circuit opening device setting said switch in its first position when in its first state and said circuit opening device setting said switch in its second position when in its second state,
   (c) a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate,
   (d) a second silicon controlled rectifier (SCR) for detecting the presence of an arcing condition between the other of said lines and the metal sheath, said second SCR setting said circuit opening device at its second state upon detecting the presence of an arcing condition between the other of said lines and the metal sheath, said second SCR comprising an anode, a cathode and a gate, and
   (e) a transistor circuit connected to the gate of said second SCR to reduce the peak voltage at which the metal sheath biases.

2. The fireguard circuit of claim 1 wherein said transistor circuit comprises a transistor, first, second and third resistors, a capacitor and a diode.

3. The fireguard circuit of claim 1 wherein the power connections for said circuit opening device and said first and second SCRs are derived from said power and neutral lines at the load.

4. The fireguard circuit of claim 1 wherein the power connections for said circuit opening device and said first and second SCRs are derived from said power and neutral lines at the power source.

5. A fireguard circuit for use as a safety device for a power cable, said power cable connecting a power source with a load, said power cable comprising a power line, a neutral line and a metal sheath which surrounds the power line and the neutral line, said fireguard circuit comprising:
   (a) a circuit breaker comprising a first switch located in one of said lines between the power source and the load, said switch having a first position in which the power source in its associated line is connected to the load and a second position in which the power source in its associated line is not connected to the load,
   (b) a circuit opening device for setting said switch in either its first position or its second position, said circuit opening device being operable in either a first state or a second state, said circuit opening device setting said switch in its first position when in its first state and said circuit opening device setting said switch in its second position when in its second state,
   (c) a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, and (d) a diode bridge connecting the first SCR to the circuit opening device, the diode bridge acting to detect the presence of an arcing condition between the other of said lines and the metal sheath, said diode bridge setting said circuit opening device at its second state upon detecting the presence of an arcing condition between the other of said lines and the metal sheath.

6. The fireguard circuit of claim 5 wherein the power connections for said circuit opening device, said first SCR and said diode bridge are derived from said power and neutral lines at the load.

7. The fireguard circuit of claim 5 wherein the power connections for said circuit opening device, said first SCR and said diode bridge are derived from said power and neutral lines at the power source.

8. A fireguard circuit for use as a safety device for a power cable, said power cable connecting a power source with a load, said power cable comprising a power line, a neutral line and a metal sheath which surrounds the power line and the neutral line, said fireguard circuit comprising:

(a) a circuit breaker comprising a first switch located in one of said lines between the power source and the load, said switch having a first position in which the power source in its associated line is connected to the load and a second position in which the power source in its associated line is not connected to the load, (b) a circuit opening device for setting said switch in either its first position or its second position, said circuit opening device being operable in either a first state or a second state, said circuit opening device setting said switch in its first position when in its first state and said circuit opening device setting said switch in its second position when in its second state, (c) a first silicon controlled rectifier (SCR) for detecting the presence of an arcing condition between one of said lines and the metal sheath, said first SCR setting said circuit opening device at its second state upon detecting the presence of an arcing condition between one of said lines and the metal sheath, said first SCR comprising an anode, a cathode and a gate, (d) a second silicon controlled rectifier (SCR) for detecting the presence of an arcing condition between the other of said lines and the metal sheath, said second SCR setting said circuit opening device at its second state upon detecting the presence of an arcing condition between the other of said lines and the metal sheath, said second SCR comprising an anode, a cathode and a gate, and (e) a zener diode connected in series to the metal sheath to reduce voltage bias in the metal sheath.

9. The fireguard circuit of claim 8 wherein said zener diode includes an anode and a cathode, the cathode of said zener diode being connected to the metal sheath.

* * * * *